(12) United States Patent
Dorch et al.

(10) Patent No.: US 11,574,345 B2
(45) Date of Patent: *Feb. 7, 2023

(54) EDGE APPLIANCE TO PROVIDE CONVERSATIONAL ARTIFICIAL INTELLIGENCE BASED SOFTWARE AGENTS

(71) Applicant: ConverseNowAI, Austin, TX (US)

(72) Inventors: Jon Dorch, Austin, TX (US); Zubair Talib, Irvine, CA (US); Akshay Labh Kayastha, Karnataka (IN); Vinay Kumar Shukla, Austin, TX (US); Rahul Aggarwal, Austin, TX (US)

(73) Assignee: ConverseNowAI, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,515

(22) Filed: Jun. 3, 2022

(65) Prior Publication Data
US 2022/0318860 A1  Oct. 6, 2022

Related U.S. Application Data

(63) Continuation-in-part of application No. 17/491,533, filed on Oct. 1, 2021, now Pat. No. 11,354,760, which
(Continued)

(51) Int. Cl.
*G06Q 30/02* (2012.01)
*G10L 15/28* (2013.01)
(Continued)

(52) U.S. Cl.
CPC ........ *G06Q 30/0281* (2013.01); *G06Q 20/20* (2013.01); *G10L 15/083* (2013.01); *G10L 15/28* (2013.01)

(58) Field of Classification Search
USPC .......... 704/246, 247, 251, 252, 275
See application file for complete search history.

(56) References Cited

U.S. PATENT DOCUMENTS

| 2002/0111881 A1* | 8/2002 | Walker | G06Q 20/20 707/737 |
| 2006/0076397 A1* | 4/2006 | Langos | G06Q 10/087 235/375 |

(Continued)

*Primary Examiner* — Leonard Saint-Cyr
(74) *Attorney, Agent, or Firm* — Shiv S. Naimpally; Grable Martin Fulton PLLC

(57) ABSTRACT

In some aspects, an edge appliance is placed in an active mode and causes a software agent that is based on a machine learning algorithm to engage in a conversation to take an order from a customer that is located at an order post. The edge appliance provides, using a communication interface, audio data that includes the conversation, to a communications system of a restaurant. The edge appliance provides, using the communication interface, a content of a cart associated with the order to a point-of-sale terminal of the restaurant. If the edge appliance determines, using the communication interface, that a microphone of the communication system is receiving audio input from an employee, the edge appliance automatically transitions the edge appliance from the active mode to an override mode, enabling the employee to receive a remainder of the order from the customer.

20 Claims, 9 Drawing Sheets

Related U.S. Application Data is a continuation-in-part of application No. 17/464,425, filed on Sep. 1, 2021, now Pat. No. 11,355,122, which is a continuation-in-part of application No. 17/366,941, filed on Jul. 2, 2021, which is a continuation-in-part of application No. 17/184,207, filed on Feb. 24, 2021.

(51) Int. Cl.
*G10L 15/08* (2006.01)
*G06Q 20/20* (2012.01)

(56) References Cited

U.S. PATENT DOCUMENTS

| | | | |
|---|---|---|---|
| 2007/0007331 A1* | 1/2007 | Jasper | G07G 1/14 235/379 |
| 2007/0040026 A1* | 2/2007 | Vleet | G06Q 20/20 235/383 |
| 2008/0222004 A1* | 9/2008 | Pollock | G06Q 30/0613 705/15 |
| 2019/0108566 A1* | 4/2019 | Coleman | G06Q 30/0633 |
| 2019/0251611 A1* | 8/2019 | Coleman | G06Q 30/0633 |

* cited by examiner

EDGE APPLIANCE TO PROVIDE CONVERSATIONAL ARTIFICIAL INTELLIGENCE BASED SOFTWARE AGENTS

CROSS-REFERENCE TO RELATED APPLICATIONS

The present patent application is a continuation-in-part of U.S. patent application Ser. No. 17/491,533, filed Oct. 1, 2021, entitled "ORDER POST TO ENABLE PARALLELIZED ORDER TAKING USING ARTIFICIAL INTELLIGENCE ENGINE(S)", which is a continuation-in-part of U.S. patent application Ser. No. 17/464,425 filed Sep. 1, 2021, entitled "USING MACHINE LEARNING TO CORRECT THE OUTPUT OF AN AUTOMATIC SPEECH RECOGNITION SYSTEM", which is a continuation-in-part of U.S. patent application Ser. No. 17/366,941, filed on Jul. 2, 2021, entitled "AUTOMATED ORDERING SYSTEM", which is a continuation-in-part of U.S. application Ser. No. 17/184,207 filed Feb. 24, 2021, entitled, "DETERMINING ORDER PREFERENCES AND ITEM SUGGESTIONS", all of which are incorporated by reference herein in their entirety and for all purposes as if completely and fully set forth herein.

BACKGROUND OF THE INVENTION

Field of the Invention

This invention relates generally to systems to order products and services and, more particularly to automated systems to order products and services.

Description of the Related Art

Restaurants face many challenges. One challenge is to efficiently take orders during peak demand times, such as breakfast (e.g., 6-10 AM), lunch (11 AM-1 PM), and dinner (4-7 PM). Some restaurants use "line busting" techniques to reduce wait times when customers are queued up during peak times. For example, a restaurant may deploy employees equipped with order taking tablets to take orders from customers waiting in a line (e.g., in a queue). If customers are in their vehicles waiting to go through a drive-through, the employees may end up being deployed outdoors (e.g., in the drive-through and/or parking area) in inclement weather (e.g., heat, rain, sleet, hail, snow, or the like). In addition, the employees are being deployed into an area in which moving vehicles are present, creating the possibility that one or more employees may come into contact with a vehicle and become injured.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, an edge appliance includes (1) an order post interface to connect to one or more order posts, (2) a communication interface to connect to: (i) a communications system of a restaurant, and (ii) a point-of-sale terminal of the restaurant, (3) one or more processors, and (4) a memory device to store instructions executable by the one or more processors to perform operations. The operations include determining that the edge appliance is in an active mode and, in response, causing a software agent that is based on a machine learning algorithm to engage in a conversation with a customer to take an order from the customer. For example, the customer may be located at a particular order post of the one or more order posts. The edge appliance provides, using the communication interface, audio data that includes the conversation to the communications system. The edge appliance provides, using the communication interface, a content of a cart associated with the order to the point-of-sale terminal. The edge appliance determines, using the communication interface, that a microphone of the communication system is receiving audio input from an employee of the restaurant and automatically (without human interaction) transitions the edge appliance from the active mode to an override mode to enable the employee to receive a remainder of the order from the customer.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
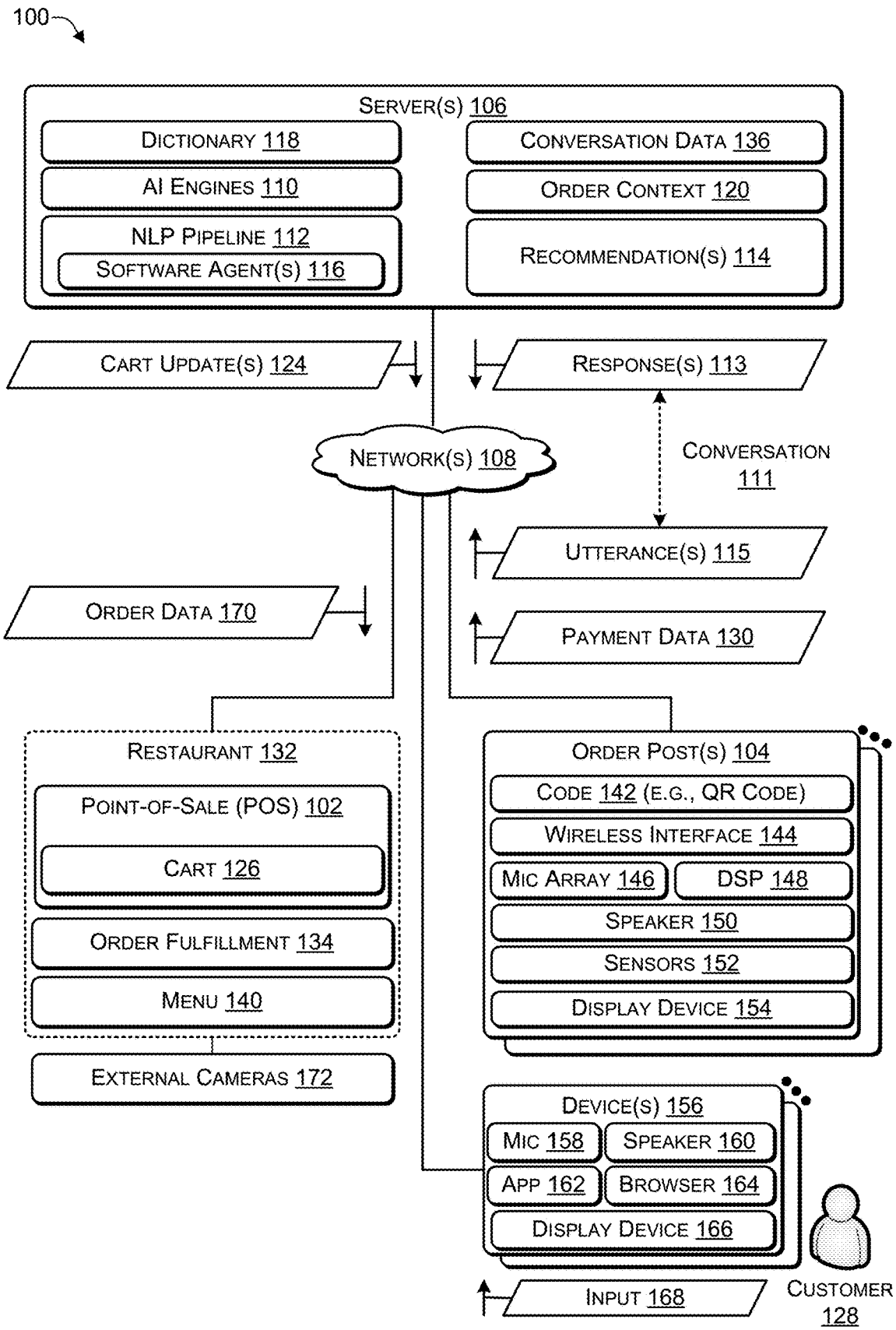
FIG. 1 is a block diagram of a system that includes one or more order posts in communication with a server hosting multiple artificial intelligence (AI) engines, according to some embodiments.

U.S. patent application Ser. No. 17/184,207 describes a system in which a machine learning algorithm (e.g., an artificial intelligence (AI) engine) monitors a conversation between a customer (also referred to as a guest) and an employee (also referred to as a crew member) at a quick service restaurant (QSR). As the system is monitoring the conversation, the system interacts with a point-of-sale (POS) terminal to add, subtract, modify, or any combination thereof the contents of a cart. For example, if the customer is placing an order for one or more food items, the system may automatically add contents to the cart based on the customer's voice input. To illustrate, if the customer says "Two large pepperoni pizzas" then the system automatically (e.g., without human interaction) adds two large pepperoni pizzas to the cart. Thus, the employee verbally interacts with the customer, without interacting with the point-of-sale terminal, and with the system interacting with the point-of-sale terminal. The employee observes the system modifying the contents of the cart while the employee is verbally interacting with the customer. The employee may interact with the point-of-sale terminal to make corrections if the system makes an error. The system may provide upsell suggestions to the employee to provide to the customer. The upsell suggestions may include increasing a size of an item ordered by the customer (e.g., "Would you like an extra-large instead of a large for just two dollars more?", adding an item (e.g., "Would you like to add something to drink?"), or both. The upsell suggestions may be provided to the employee via, for example, audibly (e.g., via an earpiece) or visually (e.g., displayed on the point-of-sale terminal). In addition, the system may be used to train new employees by prompting them as to what to say to the customer during a conversation to take an order.

The conversation data that includes the verbal interaction between the employee and the customer when the customer is placing an order is archived. The conversation data is used to train an AI engine to provide a software agent (e.g., sometimes referred to as a "chat bot"). By using a large quantity of conversation data between human employees and human customers to train the software agent, the software agent is able to mimic the way in which a human employee takes in order in such a way that the human customer may be unaware that they are interacting with a software agent rather than a human employee. In this way, a human employee is replaced by a software agent to take an order from a customer, thereby saving the restaurant money and increasing profit margins.

To address the large number of customers that arrive during peak times (e.g., around breakfast, lunch, and dinner), a restaurant may deploy order posts in an area that is proximate to the restaurant, such as drive-through lane(s), a parking lot, or the like, to enable customers lined up in their vehicles to place orders using the order posts. The order posts offer multiple advantages as compared to sending employees equipped with order-taking tablets into drive-through lanes and/or a parking lot to take orders from customers in their vehicles. First, employees are not sent out in inclement weather to take orders. Second, employees are not sent out in an area where vehicles are moving around and there is a possibility that the employees could be injured by the moving vehicles. Third, the restaurant may use fewer employees because the restaurant may not hire employees for deployment during peak ordering periods. Fourth, orders can be taken more quickly because multiple orders can be received via multiple order posts simultaneously (e.g., substantially at the same time). Fifth, more orders can be processed and enabling the restaurant to increase order throughput during peak times, thereby increasing the amount of revenue taken in during peak times. Sixth, customer satisfaction may be increased because, instead of waiting idly in their vehicles, customers are able to provide their order while their vehicle is in a queue, decreasing the time for the customer to receive their order.

In some cases, an individual order post may include a scannable (e.g., quick reference (QR)) code that when scanned by a customer's device (e.g., smartphone), automatically connects the device to a software agent to enable the customer to place an order. The code may include information, such as the name of the restaurant, a location where the restaurant specific application ("app") can be downloaded, a network site associated with the restaurant, a location of the restaurant (e.g., to enable the app or browser to open to a location-specific menu), a way of directly communicating with a software agent, other restaurant-related information, or any combination thereof. In some cases, scanning the code may cause the restaurant specific app to open up to an ordering page to enable the customer to use voice input and/or touch input on the touchscreen of the device to place an order. In other cases, scanning the code may cause a browser executing on the device to open to a restaurant specific ordering site to enable the customer to use voice input and/or touch input on the touchscreen of the device to place an order.

In some cases, an individual order post may include a microphone, a speaker, and one or more sensors. The order post may use the sensors to detect the presence of a customer by detecting the presence of the customer's vehicle (e.g., by using a camera sensor, a mass sensor, or the like). The order post may detect the presence of the customer by detecting (e.g., using Bluetooth or another nearfield communication technology) the presence of a customer device, such as a smartphone or a device built-in to the vehicle (e.g., that runs Apple® Car Play, Android® Auto, or the like). The microphone and speaker enable the customer to be connected to and place an order with a software agent. In some cases, the order post may include a touchscreen display device to enable the customer to use touch input and/or voice input to place an order with the software agent.

Some restaurants may be in locations where internet access is either unavailable or bandwidth constrained, preventing customers from having issue-free conversations with software agents. For example, bandwidth constrained locations may suffer from issues such as dropped calls between a software agent and a customer, poor voice quality, and the like. In such locations, the systems and techniques described herein use an edge appliance that interfaces between one or more order posts and the restaurants' communication system and is capable of executing one or more conversational AI based software agents (referred to herein as "software agents" or "chat bots") to provide software agents to take orders from customers. The edge appliance enables a restaurant to use software agents to take customer orders when access to high-speed internet is unavailable.

As a first example, an edge appliance includes: (1) an order post interface to connect to one or more order posts, (2) a communication interface to connect to: (i) a communications system of a restaurant, and (ii) a point-of-sale terminal of the restaurant, (3) one or more processors, and (4) a memory device to store instructions executable by the one or more processors to perform various operations. The operations include determining that the edge appliance is in an active mode and causing a software agent that is based on a machine learning algorithm to engage in a conversation with a customer to take an order from the customer. For example, the customer may be located at a particular order post of the one or more order posts. In some cases, the software agent is executed by the one or more processors of the edge appliance while in other cases, the software agent is executed by a server that is connected to the edge appliance via one or more networks. The software agent may engage in the conversation with the customer to take the order from the customer by receiving an utterance from the customer, predicting, using the machine learning algorithm, a response to the customer based at least in part on the utterance, and providing the response to the customer. The operations include providing, using the communication interface, audio data that includes the conversation to the communications system. The operations include providing, using the communication interface, a content of a cart associated with the order to the point-of-sale terminal. The operations include determining, using the communication interface, that a microphone of the communication system is receiving audio input from an employee of the restaurant and automatically (without human interaction) transitioning the edge appliance from the active mode to an override mode to enable the employee to receive a remainder of the order from the customer. The operations include removing the software agent from the conversation with the customer. Before determining that the edge appliance is in the active mode, the operations may include determining that the edge appliance is in a listen mode, capturing a transcription of an earlier conversation between an earlier customer and the employee and capturing the content of the cart. The operations may include correlating each turn in the earlier conversation with the content of the cart. The operations may include storing the transcription and the content of the cart to create training data. Based at least in part on determining that an amount of the training data satisfies a training data threshold, the operations may include training the machine learning algorithm using the training data to create the software agent. An individual order post of the one or more order posts may include: (1) a speaker, (2) one or more sensors, (3) one or more order post processors, (4) an order post memory device to store order post instructions executable by the one or more order post processors to perform order post operations. For example, the order post operations may include detecting, by the one or more sensors, a presence of the customer and receiving the order from the customer. For example, the order may include input that includes an utterance of the customer. The order post operations may include modifying, using digital signal processing, the utterance to create a modified utterance and sending the modified utterance to the software agent. The operations may include receiving a predicted response to the modified utterance from the software agent and playing back the predicted response via the speaker. The order post operations may include determining that the order is complete, sending order data associated with the order to the restaurant, and instructing the customer to pick up the order.

As a second example, one or more non-transitory computer-readable media store instructions executable by one or more processors of an edge appliance to perform various operations. The operations include determining that the edge appliance is in an active mode and causing a software agent that is based on a machine learning algorithm to engage in a conversation with a customer to take an order from the customer. The customer may be located at an order post. The operations include providing, using a communication interface of the edge appliance, audio data that includes the conversation to a communications system associated with a restaurant. The operations include providing, using the communication interface, a content of a cart associated with the order to a point-of-sale terminal associated with the restaurant. The operations include determining, using the communication interface, that a microphone of the communication system is receiving audio input from an employee of the restaurant and automatically (without human interaction) transitioning the edge appliance from the active mode to an override mode to enable the employee to receive a remainder of the order from the customer. The software agent may be removed from the conversation with the customer. In some cases, the software agent is executed by the one or more processors of the edge appliance. In other cases, the software agent is executed by a server that is connected to the edge appliance via one or more networks. For example, the software agent may engage in the conversation with the customer to take the order from the customer by receiving an utterance from the customer, predicting, using the machine learning algorithm, a response to the customer based at least in part on the utterance, and providing the response to the customer. In some cases, before determining that the edge appliance is in the active mode, the operations may include determining that the edge appliance is in a listen mode, capturing a transcription of an earlier conversation between an earlier customer and the employee, capturing the content of the cart, and storing the transcription and the content of the cart to create training data. After determining that an amount of the training data satisfies a training data threshold the machine learning algorithm may be trained using the training data to create the software agent.

As a third example, an edge appliance performs a method that includes determining that the edge appliance is in an active mode and causing a software agent that is based on a machine learning algorithm to engage in a conversation with a customer to take an order from the customer. The customer may be located at an order post. The method includes providing, using a communication interface of the edge appliance, audio data that includes the conversation to a communications system associated with a restaurant. The method includes providing, using the communication interface, a content of a cart associated with the order to a point-of-sale terminal associated with the restaurant. The method includes determining, using the communication interface, that a microphone of the communication system is receiving audio input from an employee of the restaurant and automatically (without human interaction) transitioning the edge appliance from the active mode to an override mode to enable the employee to receive a remainder of the order from the customer. The method may include removing the software agent from the conversation with the customer. In some cases, the software agent is executed by the edge appliance while in other cases the software agent is executed by a server that is connected to the edge appliance via one or more networks.

FIG. 1 is a block diagram of a system 100 that includes one or more order posts in communication with a server hosting multiple artificial intelligence (AI) engines, according to some embodiments. The system 100 includes a representative employee-assistance point-of-sale (EA-POS) device 102 at a representative restaurant 132, one or more order posts 104, one or more server(s) 106, and one or more consumer devices 156, connected to each other via one or more network(s) 108.

The server 106 may host (e.g., execute) one or more AI engines 110 (e.g., machine learning algorithms, such as classifiers), a natural language processing (NLP) pipeline 112, and one or more software agents 116. The server 106 may store a dictionary 118, conversation data 136, an order context 120, and provide recommendations 114.

Each of the order posts 104 may include one or more of a code 142 (e.g., quick reference (QR) code or the like), an interface 144, a microphone array 146, a digital signal processing (DSP) module 148, a speaker 150, sensors 152, a display device 154, or any combination thereof. In some cases, one or more of the order posts 104 may be fixed at a particular location near the restaurant 132, such as in a drive-through area, a parking lot area, or the like. In some cases, one or more of the order posts 104 may be temporarily placed at a particular location near the restaurant 132. For example, a portable order post 104 may have a rechargeable battery (e.g., lithium-ion (LiOn)) or the like and a transportation mechanism (e.g., wheels) to enable the order post 104 to be temporarily placed (e.g., at a particular time, such as at the beginning of each day) at a particular location to handle increased drive-through traffic, e.g., instead of sending employees with ordering-taking tablets into the drive-through or parking lot area. At a particular time, such as at the end of each day, the portable order posts 104 may be transported (e.g., wheeled) back into the restaurant 132 and the rechargeable battery recharged for the next usage. One of the AI engines 110 may perform traffic management by (i) directing vehicles to particular order posts 104, (ii) directing vehicles to a pick-up window to pick up an order, (iii) activate and deactivate the order posts 104 based on an amount of traffic, or any combination thereof.

In some cases, the AI engines 110, the NLP pipeline 112, and the like may execute on at least one of the order posts 104. In such cases, one of the software agents 116 executing on a particular one of the order posts 104 may take an order from the customer 128 (e.g., via the conversation 111) and communicate order data 170 to the restaurant 132. In this way, the order posts 104 may perform order processing at the edge, without involving the server 106. The advantage of such an arrangement is that a local area network (LAN), such as a Wi-Fi network or the like, that includes the order posts 104 and the restaurant 132 is able to process orders, e.g., without using a wide area network (WAN). Such a system may be deployed where a WAN is unavailable, provides intermittent connectivity, or is cost prohibitive.

The device 156 may be a smartphone, tablet, or another type of computing device and may include a microphone ("mic") 158, a speaker 160, and a display device 166. In some cases, the display device 166 may include a touchscreen display device to enable a customer 128 to provide input 168. The device 156 may execute a browser capable of browsing the Internet. The browser 164 may be capable of navigating to a website associated with the restaurant 132 to enable the customer 128 to place an order. In some cases, the device 156 may include an application ("app") 162 associated with the restaurant. The app 162 may enable a user to connect with the restaurant 132 to place an order (e.g., by sending the order data 170 to the restaurant 132).

The customer 128 may use the customer device 156 to initiate an order to the restaurant 132. The order posts 104 may be deployed in an area near a restaurant, such as a drive-thru area, a parking area, or the like. In some aspects, the order post 104 may include a scannable code 142. A customer 128 may use the device 156 (e.g., a smartphone) to scan the code 142. The code 142 may include information, such as a name of the restaurant 132, a location of the restaurant 132, and other restaurant-related information. In some cases, scanning the code 142 may cause the device 156 to directly connect with one of the software agents 116, e.g., without opening the app 162 and without using the browser 164. For example, scanning the code 142 may cause the device 156 to display a large user interface (UI) element (e.g., "Press to order") that when touched, causes the device 156 to directly connect with one of the software agents 116.

Scanning the code 142 may cause the device 156 to determine whether the app 162 is installed on the device 156. The app 162 may be associated with the restaurant 132. For example, if the restaurant 132 is part of a particular restaurant chain, then the app 162 may be associated with the particular restaurant chain. If the app 162 is not installed, the device 156 may automatically navigate to a software store (e.g., app store) and ask the customer 128 whether to install the app 162 on the device 156. If the customer 128 indicates to install the app 162, then the device 156 may install the app 162, identify the location of the restaurant 132 based information included in the code 142, open a menu 140 in the app 162, and enable the customer 128 to place an order with the restaurant 132. If the app 162 is already installed, scanning the code 142 using the device 156 may cause the app 162 to automatically open, automatically select the restaurant 132 based on the location specified by the code 142, and automatically display the menu 140 to enable the customer 128 to place an order. If the app 162 is not installed on the device 156 and if the customer 128 indicates that the app 162 is not to be installed, then the device 156 may automatically open a browser 164 and navigate to a website of the restaurant 132 to enable the customer 128 to place an order.

As the customer 128 places an order with one of the software agents 116, the order post 104 or the device 156 may display text of what the customer is ordering, e.g., "hash browns and a cup of coffee" and display contents of the cart 126. In some cases, the device 156 may be a component of a vehicle in which the customer 128 is located. For example, the device 156 may run Apple® Car Play, Android® Auto, or the like. In such cases, the ordering process may use the handsfree capabilities of the device 156 built-in to the customer's vehicle.

In some aspects, the order post 104 may include the interface 144. The interface 144 may include a wireless communications interface, such as, for example, a cellular technology (e.g., code division multiple access (CDMA), global system for mobile (GSM), universal mobile telephone system (UMTS), or the like), Wi-Fi, Bluetooth, another type of wireless technology, or any combination thereof, to communicate with the server 106 via the network 108. The interface 144 may enable the order post 104 to communicate (e.g., via the network 108) with one of the software agents 116 on the server 106. For example, one of the software agents 116 may interact with a customer 128 to obtain the order data 170.

The customer 128 may place an order by speaking towards the order post 104. In some cases, the order post 104 may respond to a "wake word" (Domino, Chick-fill, or the like) or "wake phrase" ("I'd like to order" or "I'd like to place an order") that, when spoken by the customer 128, causes the order post 104 to enter into an order-taking mode. A wake word is a special word or phrase that, when spoken, is used to activate the order post 104. The order post 104 may capture utterances of the customer 128 using the microphone array 146. The microphone array 146 may include one or more microphones positioned in such a way that utterances from customers located in vehicles having different heights and located different distances from the order post 104 may be captured. For example, one of the microphones in the microphone array 146 may be used to capture ambient sounds in the surrounding area for noise cancellation purposes and used to remove noise from the audio captured by a remainder of the microphones in the microphone array 146. To illustrate, a phase of the audio (e.g., noise) captured by one of the microphones may be inverted (e.g., 180 degrees out of phase) relative to a phase of the audio captured by the remaining microphones to provide noise cancellation. In some cases, the audio may be filtered prior to inverting the phase. For example, in some aspects, a filter may be used to filter out voice frequencies in the phase of the non-voice frequencies may be inverted and mixed with the audio captured by the remaining microphones. In some aspects the digital signal processing module (DSP) module 148 may be used to modify frequencies and/or a phase of the audio captured by the microphone array 146 for better understanding of the utterances 115 by the AI engines 110. For example, the DSP module 148 may be used to perform noise cancellation. Thus, the DSP module 148 may modify the audio received by the microphone array 146 to increase machine intelligibility (e.g., rather than human intelligibility). The speaker 150 may be used to provide audio output of the responses 113 from the software agent 116.

One or more employees of the restaurant 132 may wear headsets that enable each employee to listen in to the conversation 111 between the customer 128 and one of the software agents 116. In this way, as the customer 128 is placing the order, the employee can begin preparing food items, assembling the order, and the like. For example, if the customer 128 says "large cola", then the employee, hearing this, can begin filling a large cup with cola. If the customer 128 says "large fries", then the employee can, grab large fries if available and if no fries are available, begin deep frying frozen French fries.

In some cases, the order post 104 may include sensors 152 to detect the presence of a customer (e.g., determine when a customer's vehicle is within a pre-determined distance of the order post) and/or enable the order post 104 to function as an autonomous vehicle that moves from one vehicle to a next vehicle in an area (e.g., drive-through, parking lot, or the like). For example, the sensors 152 may include a camera, a directional Bluetooth sensor, a mass sensor, another type of sensor or any combination thereof. The order post 104 may use the wireless interface to connect to one or more external cameras 172 that are external to the order post 104, e.g., the external cameras 172 are placed in such a way as to provide higher elevation (e.g., aerial) views of portions of the parking area and drive through area around the restaurant 132. If the order post 104 is configured as an autonomous vehicle, the one or more external cameras 132 may enable the order post 104 to identify a next vehicle to attend to and a path to enable the order post 104 to navigate to the next vehicle. To enable the order post 104 to move as an autonomous vehicle, the sensors 152 may include radar sensors, light detection and ranging (lidar) sensors, laser sensor, other types of sensors used by autonomous vehicles, or any combination thereof. In some cases, the camera may take a picture of the license plate of a vehicle in which the customer 128 is located and, if the customer 128 has previously given permission, look up the license plate to identify the customer 128. In some cases, the camera sensor may be used to perform facial recognition of the driver to identify the customer 128. In some cases, the microphone may gather the sound of the customer's voice and use voice recognition to recognize the customer. For example, the customer 128 may speak their name "Hi, this is John Smith" and the order post 104 may use voice recognition to recognize the customer 128. Thus, the order post may use facial recognition (e.g., using a camera sensor to recognize a face of the driver or an occupant of the vehicle), vehicle recognition (e.g., using a camera sensor to recognize a license plate of the customer's vehicle), device recognition (e.g., recognizing the device 156 using nearfield communication (NFC), such as Bluetooth or the like), or any combination thereof.

In some aspects, the order post 104 may include the display device 154. The display device 154 may be used to display items from the menu 140, items that the customer 128 previously ordered (if the customer 128 is recognized), upsell items (e.g., display a hot item, such as a piece of pie or a cup of hot cider, when the weather is cold or display a cold item, such as an ice cream sundae or a milkshake, when the weather is hot), and the like. In some cases, the display device 154 may be touch sensitive and may be capable of receiving input 168 from the customer 128. For example, the customer 128 may place an order (e.g., send the order data 170) using a combination of the utterances 115 and the input 168 received by the display device 154. The display device 154 may be used to train/prompt the customer 128 as to how to interact with the software agents 116, such as displaying "You can say things like 'I'd like to order 2 chocolate milkshakes'" or the like.

In some cases, a human employee may receive the order and the AI engine 110 may monitor the conversation 111, including the utterances 115 of the customer and responses 113. Initially, the responses 113 may be from a human employee of the restaurant 132. The AI engine 110 may determine which items from a menu 136 of the restaurant 132 the customer is ordering. The AI engine 110 may monitor the conversation 111 between the customer and the employee and automatically (e.g., without human interaction) modify a cart 126 hosted by the EA-POS device 102. In other cases, a human employee may receive the order, the AI engine 110 may monitor the conversation between the customer and the employee, and monitor what the employee enters into the EA-POS device 102. The employee entries may be used as labels when training the AI engine 110 and various machine learning (ML) models in the NLP pipeline 112. The AI engine 110 may use a dictionary 118 to identify words in the conversation. The AI engine 110 may keep a running track of an order context 120 associated with each particular order. The order context 120 may include order data associated with previously placed orders by each customer, trending items in a region in which the customer is located, specials/promotions (e.g., buy one get one free (BOGO), limited time specials, regional specials, and the like) that the restaurant 132 is currently promoting (e.g., on social media, television, and other advertising media), and other context-related information.

The customer may use a payment means, such as a digital wallet, to provide payment data to complete the order. In response, the restaurant 132 may initiate order fulfillment 134 that includes preparing the ordered items for take-out, delivery, or in-restaurant consumption. Such conversations between human employees and customers may be stored as conversation data 136. The conversation data 136 is used to train a machine learning algorithm (e.g., the software agent 116) to take orders from customers in a manner similar to a human employee, such that the customers may be unaware that they are interacting with the software agent 116 rather than a human employee.

Subsequently (e.g., after the software agent 116 has been trained using the conversation data 136), when the customer 128 uses the customer device 156 or the order post 104 to initiate a communication to the restaurant 132 to place an order, the communication may be routed to the software agent 116. The customer 128 may have a conversation 111 that includes utterances 115 of the customer 128 and responses 113 by the software agent 116. In such cases, the conversation 111 may not include an employee of the restaurant. The conversation may be routed to a human being (e.g., employee) under particular conditions, such as due to an inability of the software agent 116 to complete the conversation 111, a server malfunction, or the like.

The conversation 111 may include voice input (e.g., received via the microphone array 146 or the microphone 158), input 168 (e.g., received via the display device 154 or the display device 166), or another type of input provided by the customer 128 using the order post 104 or the device 156. For example, in some cases, the conversation 111 may include the voice of the customer in the form of the utterances 115 and the responses 113 of the software agent 116. In some cases, the responses 113 may be vocalized (e.g., converted into a synthesized voice) using text-to-speech technology. One or more of the utterances 115 may result in the server 106 sending a cart update 124 to update a cart 126 at the point-of-sale device 102. The AI engine 110 may determine (e.g., predict) recommendations 114 that the software agent 116 provides in the responses 113 as part of the conversation 111. For example, the recommendations 114 may be based on items that the customer has previously ordered, items that are currently popular in the customer's region (e.g., zip code, city, county, state, country, or the like), and the like. To determine items that the customer previously ordered, the AI engine 110 may determine an identity of the customer based on, for example, an identifier (e.g., a phone number, an Internet protocol (IP) address, caller identifier, or the like) associated with the customer device 156, voice recognition, facial recognition (e.g., in the case of a video call), or another identifying characteristic associated with the order initiated by the customer device 156.

After the customer has completed an order, the customer may provide payment data 130, for example using an account (e.g., bank account, credit card account, debit card account, gift card account, or the like) stored in a digital wallet. The payment data 130 may be sent to the point-of-sale device 102 to complete a checkout process for the cart 126. After the payment data 130 has been received and the payment data processed, the restaurant 132 may initiate order fulfillment 134, such as preparing the items in the order for take-out, delivery, in-restaurant dining, or the like.

The system 100 is configured to enable the interactions between human customers and software agents 116 to be natural and human-like to such a degree that the human customers may conclude that they interacted with a human rather than a software agent. The software agents 116 engage in human-like conversations in which the software agents 116 exhibit flexibility in the dialog. The software agents 116 are trained, based on the conversation data, to have an understanding of complex natural language utterances that take into account the nuances of oral and written communications, including both formal communications and informal communications. The term 'utterance' may include anything spoken or typed by a customer, including a word, a phrase, a sentence, or multiple sentences (including incomplete sentences that can be understood based on the context).

The system 100 includes a voice ordering system that takes the utterances 115 of a customer and processes the utterances 115 through the Natural Language Processing (NLP) pipeline 112 (also referred to as a Natural Language Understanding (NLU) pipeline). The output of the NLP pipeline 112 are used by the server 106 to select: (1) a next one of the responses 113 that the software agent 116 provides the customer in the conversation 111 and (2) the cart updates 124 to update the cart 126.

The systems and techniques described herein provide a data-driven approach to the NLP pipeline 112. The conversation data 136 includes hundreds of thousands of conversations between a human customer and a human employee and is used to train a supervised machine learning model (e.g., the software agents 116) to make the responses 113 of the software agents 116 as human-like as possible. The conversation data 136 includes human-to-human conversations used to train a domain specific language model (e.g., the software agents 116). The systems and techniques described herein take advantage of newly available language models that provide a greater capacity for leveraging contextual information over the utterances 115 (e.g., a word, a phrase, a sentence, or multiple sentences including incomplete sentences).

The conversation data between customers and human employees may be stored to create a database of conversations associated with, for example, ordering food at a quick service restaurant. The database of conversation data may be gathered over multiple months or years and used to train a machine learning algorithm, such as a software agent, to automatically take an order from a customer as if the customer was having a conversation with a restaurant employee. For example, given a conversation context and an utterance from the customer, the software agent determines and verbalizes (e.g., using text-to-speech) an appropriate and automated response using a natural language processing pipeline.

Thus, a system may include an automated ordering system to enable customers to initiate and complete an order using voice input, touch input, text, or the like. By deploying one or more order posts in an area that is proximate to the restaurant, such as drive-through lane(s), a parking lot, or the like, customers lined up in their vehicles during peak times can place orders using the order posts. The system offers multiple advantages as compared to sending employees equipped with order-taking tablets into drive-through lanes and/or a parking lot to take orders from customers in their vehicles. First, employees are not sent out in inclement weather to take orders. Second, employees are not sent out in an area where vehicles are moving around and there is a possibility that the employees could be injured by the moving vehicles. Third, the restaurant may use fewer employees because the restaurant may not hire employees for deployment during peak ordering periods. Fourth, orders can be taken more quickly because multiple orders can be received via multiple order posts simultaneously (e.g., substantially at the same time). Fifth, more orders can be processed and enabling the restaurant to increase order throughput during peak times, thereby increasing the amount of revenue taken in during peak times. Sixth, customer satisfaction may be increased because, instead of waiting idly in their vehicles, customers are able to provide their order while their vehicle is in a queue, decreasing the time for the customer to receive their order.

Figure 2:
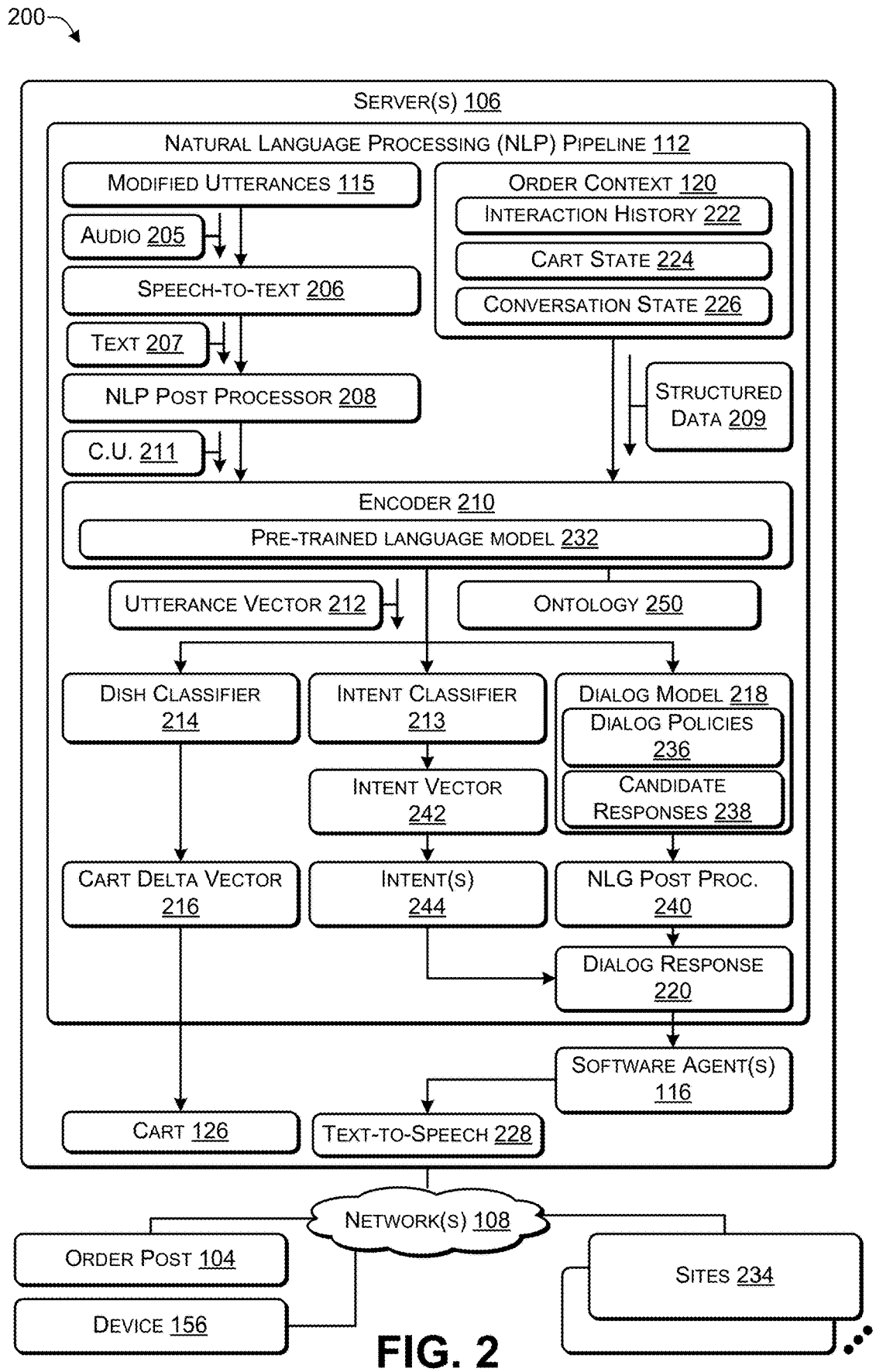
FIG. 2 is a block diagram of a natural language processing (NLP) pipeline, according to some embodiments.

FIG. 2 is a block diagram 200 of the natural language processing (NLP) pipeline 112 of FIG. 1, according to some embodiments. The NLP pipeline 112 may receive the utterances 115 of a customer (e.g., from the order post 104 or from the customer device 156 of FIG. 1). The NLP pipeline 112 may process audio data 205 that includes at least a portion of the utterances 115 using a speech-to-text converter 206 to convert the audio data 205 to text 207. For example, the utterances 115 may be "I would like 2 large pizzas with peperoni and mushrooms."

The order context 120 may include an interaction history 222 between the software agent 116 and the customer, a current cart state 224, and a conversation state 226. The interaction history 222 may include interactions between the customer and one of the software agents 116, including the utterances 115 of the customer and the responses 113 of the software agent 116. The cart state 224 identifies a state of the customer's cart including, for example, items in the cart, how many of each item is in the cart, a price associated with each item, a total price associated with the cart, whether payment has been received (e.g., whether the cart has been through check out), a most recent change (e.g., addition, subtraction, or modification) to one or more items in the cart, other cart related information, or any combination thereof. The conversation state 226 may indicate a state of the conversation between the customer and the software agent 116, such as whether the conversation is in progress or has concluded, whether the customer is asked a question and is waiting for a response from the software agent 116, whether the software agent 116 has asked a question and is waiting for a response from the customer, a most recent utterance from the customer, a most recent response from the software agent 116, other conversation related information, or any combination thereof.

The utterances 115 are provided by a customer that has contacted the restaurant 132 of FIG. 1 to place an order. The utterances 115 are in the form of the audio data 205. The speech-to-text converter 206 converts the audio 205 into text 207. The text 207 is processed using an NLP post processor 208 that makes corrections, if applicable, to the text 207 to create corrected utterances 209. For example, the text 207 may include an incorrect word that is plausible in the context and multiple similar sounding words may be equally plausible. The NLP post processor 208 may make corrections by identifying and correcting one or more incorrect words in the text 207 to create corrected utterances 209. After the NLP post processor 208 processes the text 207, the corrected utterances 209 are sent to the encoder 210.

The order context 120, including the interaction history 222, the cart state 224, and the conversation state 226, are provided to the encoder 210 in the form of structured data 209. The structured data 209 includes defined data types that enable the structured data 209 to be easily searched. Unstructured data is raw text, such as "two pizzas with sausage and pepperoni". Structured data may use a structured language, such as JavaScript Object Notation (JSON), Structured Query Language (SQL), or the like to represent the data. For example, "two pizzas with sausage and pepperoni" may be represented using structured data as: {"Quantity": 2, "Item": "Pizza", "Modifiers": ["Pepperoni", "Sausage" ] }. In structured data 209, each data item has an identifier or some fixed structured meaning and is not subject to natural language meaning or interpretation. The order context 120 captures where the customer and the software agent 116 are in the conversation 111 (e.g., what has already been said), what items are in the cart 126, and the like.

An encoder 210 of the NLP pipeline 112 receives the text 207 and the structured data 209 as input and predicts an utterance vector 212. The encoder 210 may include a pre-trained language model 232 that predicts, based on the most recent utterances 115 and the current order context 120, (1) how the cart 126 is to be modified and (2) what the software agent 116 provides as a response, e.g., dialog response 220. The encoder 210 is a type of machine learning model that uses a Bidirectional Encoder Representations from Transformers (BERT), e.g., a transformer-based machine learning technique for natural language processing (NLP), to predict the utterance vector 212. The encoder 210 may be a pre-trained language model 232 that converts the text 207 of the utterances into a vector of numbers. The pre-trained language model 232 may be fine-tuned to a specific domain, e.g., to ordering at a restaurant and that too, at a specific type of restaurant (e.g., pizza, wings, tacos, etc.). The training is based on the conversation data 136 that has been gathered over time between customers and employees who enter data in the EA-POS 102. The employee entered data may be used as labels for the conversation data 136 when training the various machine learning models described herein. The pre-trained language model 232 associates a specific utterance, e.g., "I want chicken wings", with a specific action, e.g., entering a chicken wing order into the EA-POS 102. The pre-trained language model 232 predicts what items from the menu 136 are to be added to the cart 126 (e.g., based on one or more actions associated with the utterance 115) and which items are to be removed from the cart 126, and quantities associated with the items that are to be added and/or removed. In some aspects, the encoder 210 may be implemented as a multi-label classifier. Modifiers may include, for example, half pepperoni, half sausage, double cheese, and the like. In some cases, the pre-trained language model 232 may be structured hierarchically, e.g., with pizza at a high level and modifiers at a lower level. Alternately, the pre-trained language model 232 may use a flat system with every possible combination as a unique item.

The utterance vector 212 may be used by three classifiers (e.g., a type of machine learning algorithm, such as a support vector machine or the like), including the dish classifier, the intent classifier 213, and the dialog model 218. For example, the utterance vector 212 may be used by the dish classifier 214 to predict a multiclass cart delta vector 216. The multiclass cart delta vector 216 is used to modify the cart 126. For example, in the cart delta vector 216, the first position may indicate a size of the pizza, e.g., 1=small, 2=medium, 3=large, the second position may indicate a type of sauce, e.g., 0=no sauce, 1=1st type of sauce, 2=2nd type of sauce, the third position may indicate an amount of cheese, e.g., 0=no cheese, 1=normal cheese, 2=extra cheese, 3=double cheese, and the remaining positions may indicate the presence (e.g., 1) or the absence (e.g., 0) of various toppings, e.g., pepperoni, mushrooms, onions, sausage, bacon, olives, green peppers, pineapple, and hot peppers. Thus, (3, 1, 1, 1, 0, 0, 0, 0, 0, 0, 0, 0) is a vector representation of a large pizza with the first type of sauce, a normal amount of cheese, and pepperoni. If the utterances 115 includes "I'd like double cheese", then the vector representation may change to (3, 1, 3, 1, 0, 0, 0, 0, 0, 0, 0, 0), resulting in a corresponding change to the cart 126. Of course, this is merely an example and other vector representations may be created based on the number of options the restaurant offers for pizza size, types of sauces, amount of cheese, toppings, and the like.

The encoder 210 outputs the utterance vector 212 which a dialog model 218 uses to determine a predicted dialog response 220. For example, based on the order context 120 and the most recent utterances 115, the encoder 210 may determine the predicted response 220. The predicted response 220 is a prediction as to what a human employee would say at that point in the conversation (e.g., order context 120) based on the customer's most recent utterances 115. The encoder 210 is trained using the conversation data 136 to predict the dialog response 220 based on the utterances 115 and the order context 120. The software agent 116 converts the predicted dialog response 220 to speech using a text-to-speech converter 228. The dialog model may use dialog policies 236 and candidate responses 238 to predict the dialog response 220. In some cases, a natural language generation (NLG) post processor 240 may modify the output of the dialog model 218 to create the dialog response 220. For example, the NLG post processor 240 may modify the dialog response 220 to include local colloquialisms, more informal and less formal dialog, and the like.

Figure 5:
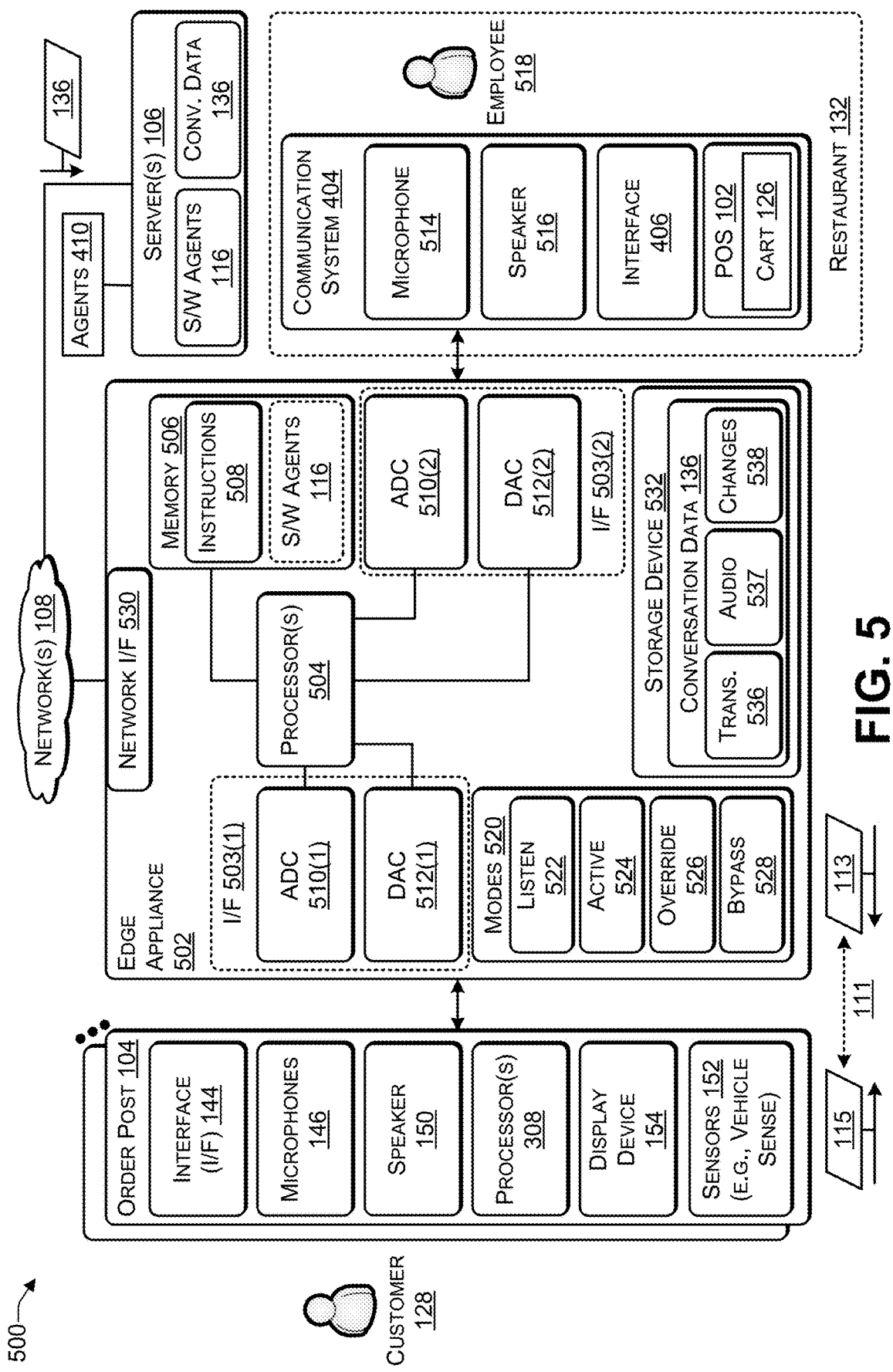
FIG. 5 is a block diagram of a system that includes an edge appliance, according to some embodiments.

During training of the machine learning model used to create the software agents 116, the human-to-human conversations in the conversation data 136 of FIG. 1 are labelled to fine tune the language model 232, as described in more detail in FIG. 5. The utterances 115 and the order context 120 (e.g., contextual language information and current cart information up to a given point time) are encoded (e.g., into the utterance vector 212) to provide the cart delta vector 216 (e.g., a delta relative to the cart 126) as well as the next predicted dialog response 220. The cart delta vector 216 identifies the steps to update the cart 126. The codified delta over the cart indicates the steps to update the cart 126 and is the label that the human operator creates when handling the conversation that afterwards becomes the training dataset. For example, the encoder 210 is able to associate a specific utterance of the utterances 115, such as "I want chicken wings", with a specific action, e.g., entering a chicken wing order into the cart 126. The encoder 210 predicts what items should be added to the cart 126 (e.g., based on the action associated with the utterance) and which items should be removed from the cart 126, and any associated quantities. In some aspects, the encoder 210 may use a multi-label classifier, such as for example, decision trees, k-nearest neighbors, neural networks, or the like. In a multi-label classifier, modifiers may include, for example, half-pepperoni, half-sausage, double cheese, and the like. In some cases, the order may use hierarchical structures, with each particular type of order, such as pizza, wings, taco, or the like, at a highest level and modifiers at a lower level in the hierarchy. For example, pizza may be at the highest level while half-pepperoni, half-sausage, double cheese, and the like may be at a lower level. In other cases, the order may use a flat system with every possible combination as a unique item. For example, (a) half-pepperoni may be a first item, (b) half-sausage may be a second item, (c) double cheese may be a third item, (d) half-pepperoni and half-sausage may be a fourth item, (e) half-pepperoni, half-sausage, and double cheese may be a fifth item, and so on.

The intent classifier 213 takes the utterance vector 212 as input and creates an intent vector 242 that represents intent(s) 244 of the utterances 115. The dialog model 218 uses the utterance vector and the intents 238 to create the dialog response 220. The dialog model 218 predicts the dialog response 220, the response that the software agent 116 to the utterance 115. In contrast, in a conventional voice-response system, the system uses a finite state machine. For example, in a conventional system, after each utterance, the system may ask for a confirmation "Did you say 'combo meal'? In the system of FIG. 2, a predictive model predicts the dialog response 220 based on the utterance 115 and the order context 120.

The dish classifier 214 predicts which items from the menu 126 the customer is ordering and modifies the cart 126 accordingly. For example, in the utterance "Can I have 2 pizzas with pepperoni, 6 chicken wings, but no salad", the dish classifier 214 determines which parts of this utterance refers to pizza. The dish classifier 214 model understands the history, e.g., there is a salad already in the cart (e.g., because it is included with chicken wings), and predicts the cart delta vector 216 to reflect how many pizzas and how many wings are there in the cart 126. The prediction of the dish classifier 214 indicates what is being added to and what is being deleted from the cart 126. Thus, based on the utterances 115 and the order context 120, the NLP pipeline 112 predicts the cart 126 and the dialog response 220. One or more of the classifiers 213, 214, 218 may use multiclass classification, a type of support vector machine. The intent classifier 213 determines intent(s) 244 of the utterances 115, e.g., is the intent 244 a menu-related question (e.g., "What toppings are on a Supreme pizza?" or a modification ("I'd link a large peperoni pizza") to the cart 126.

In some aspects, the menu 136 of the restaurant 132 of FIG. 1 may be represented as a ontology 250 (e.g., a set of menu items in the menu 136 that shows each menu item's properties and the relationships between menu items). In some aspects, the ontology 250 may be represented in the form of a vector. e.g., each type of pizza may have a corresponding vector representation. In some aspects, the menu representations may be generated from unlabeled data, to enable the NLP pipeline 112 to handle any type of information related to ordering, dishes, and food items.

The utterances 115 are used as input to the NLP pipeline 112. The utterances 115 may be in the form of a concatenated string of a set of previous utterances. The amount of utterances 115 provided to the NLP pipeline 112 may be based on how much latent knowledge of the conversation state 226 is desired to be maintained. The greater the amount of utterances 115, the better the conversation state 226. The utterances 115 may be a word, a phrase, a sentence, or multiple sentences (including incomplete sentences) that the customer provides to the software agent 116 at each turn in the conversation. For example, a typical conversation may include:

<agent>"This is XYZ pizza, how can I help you?"
<customer>"I'd like to order a large pepperoni pizza."
<agent>"Got it. Would you be interested in getting an extra large for two dollars more?"
<customer>"Okay, give me an extra large pepperoni."
<agent>"Would you like anything to drink?"
<customer>"Two bottles of water please."
<agent>"Got it. Anything else I can get for you? Dessert perhaps?"
<customer>"No. That will do it."
<agent>"Okay. Your total is $20.12. How would you like to pay?"
<customer>"Here is my credit card information <info>."
<agent? "Thanks. Please proceed to the pickup window when the display indicates your order is ready."

There are multiple turns in this example conversation, starting with "I'd like to order a large pepperoni pizza", with each turn including the customer's utterances 115 and the agent's response 220. The utterances 115 may thus include multiple sentences. In some aspects, chunking splitting may be performed, resulting in more than one representation corresponding to a unique utterance from the user. In some cases, the audio of the utterances 115 may be used as input, providing complementary features for emotion recognition, estimation of willingness to talk to AI, or for tackling issues as sidebar conversations. The satisfaction estimation based on vocal features also serves as a signal for optimizing the dialog policy.

The interaction history 222 includes contextual language information, such as, for example, the N previous utterances of the customer (N>0), the M previous responses from the software agent 116 (M>0). The cart state 224 includes current cart information. In some cases, a domain specific ontology 250 may be added as semantic representation of items in the knowledge base (e.g., the conversation data 136). The ontology 250 allows the encoder 210 to identify specific entities with which to select the correct modification to operate on the cart 126. The ontology 250 may be used to facilitate the onboarding of new items or whole semantic fields, alleviate the need for annotated data for each label (e.g., the entries of the employee into the EA-POS 102), and improve the performance of the NLP pipeline 112.

The encoder 210 creates the cart delta vector 216 that includes corresponding actions to update the cart 126 based on the most recent (e.g., latest turn) of the utterances 115. The cart delta vector 216 may be a vector, e.g., a sparse array of numbers that corresponds to a state difference. For example, for a cart that includes "Large Pepperoni Pizza", "2 Liter Coke" and "Chicken Salad", if the most recent utterance is "A large coke, but remove the salad", then the encoder 210 may output [0, 1, −1]. In this way, both the quantity and the intent to remove are encompassed.

The encoder 210 determines the utterance vector 212, a numerical representation of each input (e.g., the utterances 115 and the order context 120) based on the pre-trained language model 232. The utterance vector 212 is a type of encoding, e.g., a set of symbols that represent a particular entity. For example, in some aspects, the encoding may be an array of real numbers, a vector (or a higher dimensional extension, such as a tensor), that is generated by a statistical language model from a large corpus of data. In addition to using the conversation data 136, the encoder 210 may leverage an additional corpus of data on multiple sites 234 (e.g., Wikipedia and the like), such as food-related sites, thereby enabling the encoder 210 to engage in specialized conversations, such as food-related conversations. In some cases, the encoder 210 may be trained to engage in conversations associated with a particular type of restaurant, e.g., a pizza restaurant, a chicken wings restaurant, a Mexican restaurant, an Italian restaurant, an Indian restaurant, a Middle Eastern restaurant, or the like.

The dish classifier 214 may predict the cart delta vector 216 by passing the encoded representations in the utterance vector 212 through additional neural dialog layers for classification, resulting in a sparse vector that indicates the corresponding element(s) within all possible cart actions, e.g., a comprehensive array of labels of possible combinations. The classifiers 213, 214, 218 may be trained using the conversation data 136. The ontology 250 provides information to precise the modifiers, relating cart actions that are highly related such as adding two different variations of the same dish.

The utterances 115 (e.g., representations of the conversation 111 of FIG. 1), along with the order context 120, may be used as the input to the encoder 210 to determine a particular one of the dialog policies 236 to select the next predicted response 220 of the software agent 116. Each particular one of the dialog policies 236 may be used to predict an appropriate response 220 from multiple candidate responses 238. In some cases, the dialog model 218 may use policy optimization with features such as emotion recognition, total conversation duration, or naturalness terms. The dialog response 220 may be fed back to the dialog model 218 as contextual information. In some cases, multitask learning algorithms that combine more than one similar task to achieve better results may be used with the encoder 210 to enable the encoder 210 to learn important aspects of language modeling that serve indirectly to the final downstream task, while allowing a controlled training process via the design of the learning curriculum. The multiple and auxiliary objective functions serve to leverage more error signals during training, and make the model learn proper representations of the elements involved. Semantic and structural information about the menu 136 is encoded into the ontology 250 and used to inform the later layers of the cart prediction system (e.g., dish classifier 214).

In some cases, curriculum learning may be used to design the order with which tasks of different types or complexity are fed to the encoder 210, the dish classifier 214, the intent classifier 213, the dialog model 218, or any combination thereof, to assist tackling different tasks or to perform prolonged training. In addition, to improve extended training processes, the systems and techniques described here may use continual learning, in which the encoder 210, the dish classifier 214, the intent classifier 213, the dialog model 218, or any combination thereof, are retrained as new conversation data is accumulated. In some cases, the continual learning may be performed with elastic weight consolidation to modulate optimization parameters. For example, continual learning along with incremental learning may be used for new classes, e.g., new dishes, sequentially adding them to the objective though training the same model.

Figure 3:
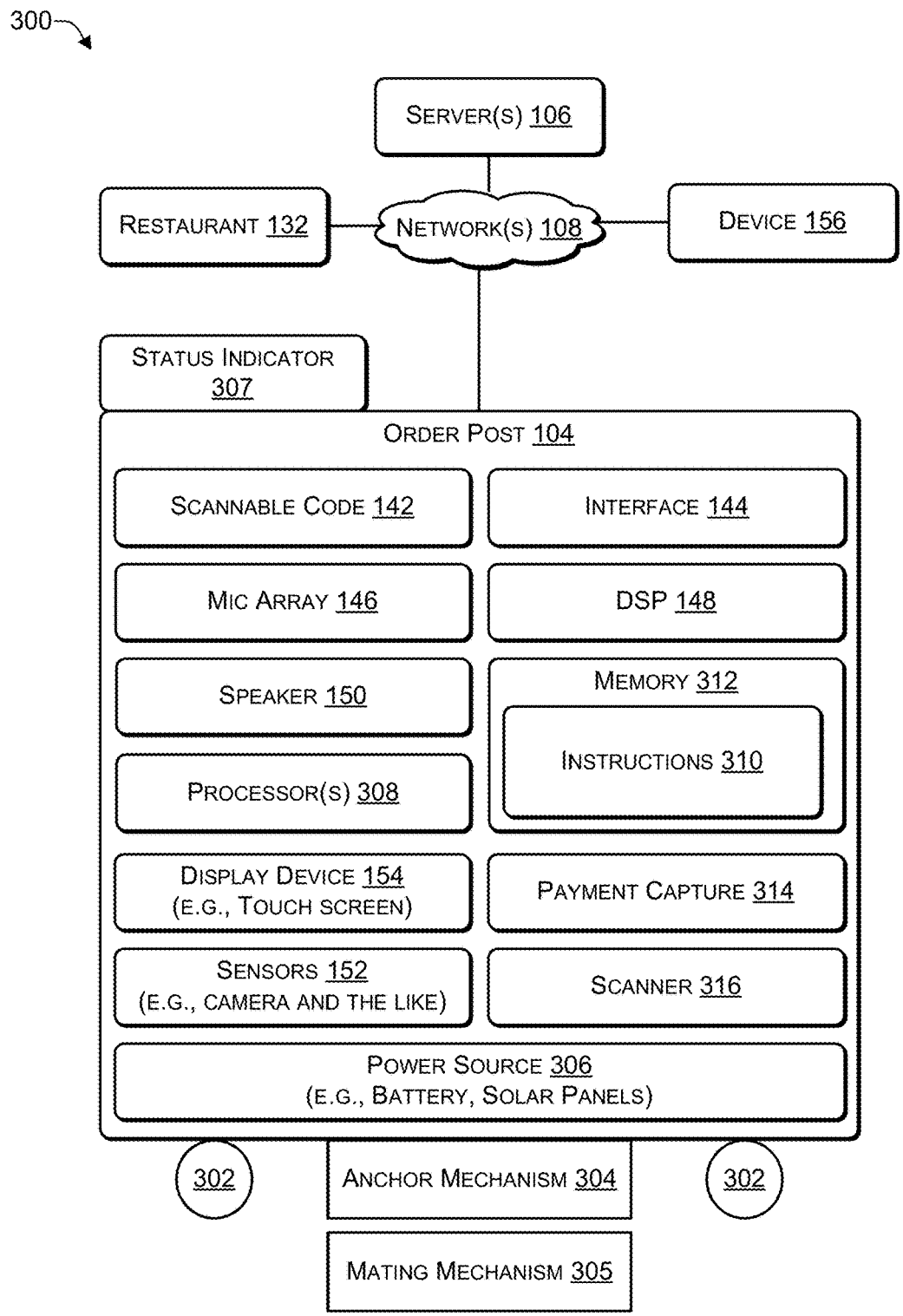
FIG. 3 is a block diagram illustrating components of an order post, according to some embodiments.

FIG. 3 is a block diagram 300 illustrating components of a representative order post, according to some embodiments. The representative order post 104 may include the scannable code 142, such as a quick reference (QR) code or the like. The interface 144 may enable the order post 104 to communicate with the network 108 and, via the network 108, communicate with the server 106 and the restaurant 132. In some cases, the representative order post 104 may include one or more processors 308 capable of executing instructions 310 stored in a memory 312 to perform the various functions described herein.

In some cases, one or more of the order posts 104 may be permanently fixed at particular locations near the restaurant 132, such as in a drive-through area, a parking lot area, or the like. For example, newly constructed or newly refurbished restaurants may include one or more permanent order posts. In some cases, one or more of the order posts 104 may be temporarily placed at a particular location near the restaurant 132. For example, older restaurants may primarily use portable order posts that can be placed in a particular location during business hours and then stored inside the restaurant after hours. A restaurant may use a combination of fixed order posts and temporary order posts.

A portable order post 104 may have a power source 306, such as a rechargeable battery (e.g., lithium-ion (LiOn)), a means for recharging the batteries (e.g., a plug to tap into the power grid, solar panels, or the like), or other power-related components. The portable order post 104 may include a transportation mechanism 302 (e.g., wheels, rollers, tracks, or the like) to enable the order post 104 to be moved to a temporary location (e.g., at a particular time, such as at the beginning of each day) to handle increased drive-through traffic, e.g., instead of sending employees with ordering-taking tablets into the drive-through or parking lot area. At a particular time, such as at the end of each day, the portable order posts 104 may be transported (e.g., wheeled) back into the restaurant 132 and the rechargeable battery of the power source 306 recharged for the next usage.

The order post 104 may include an anchor mechanism 304 that temporarily or permanently anchors the order post 104 in a particular location. For example, the anchor mechanism 304 may include an attachment mechanism to temporarily or permanently couple the order post 104 in a particular location in a drive-through or parking lot or on a side of a building in which the restaurant 132 is housed. While the anchor mechanism 304 is illustrated on a bottom of the order post 104, in some cases the anchor mechanism 304 may be located on a side or a top of the order post 104. For example, the anchor mechanism may be a mechanical (e.g., interlocking components) mechanism, a magnet-based mechanism, an electromagnet-based mechanism, or any combination thereof. To illustrate, the order posts 104 have include two components: (i) a mating mechanism 305 to which (ii) the order posts 304 can be attached (or detached)

using the anchor mechanism 304. For example, mating mechanism 305 may include a metal plate with a receptacle for the anchor mechanism 304. The anchor mechanism 304 may be attached magnetically or electro-magnetically to the mating mechanism 305. The mating mechanism 305 may be in the parking lot (e.g., drive through or curbside pickup) or on the side of a building in which the restaurant is located. In some cases, the drive-through and/or parking lot may include power receptacles and a communication port (e.g., Ethernet, universal serial bus (USB) or the like) into which the order taking device connects to. The order post 104 may be created using a ding resistant material, such as a metal, a polycarbonate, or carbon fiber.

The customer 128 may use the customer device 156 to initiate an order to the restaurant 132. The order posts 104 may be deployed in an area near a restaurant, such as a drive-thru area, a parking area, or the like. In some aspects, the order post 104 may include the scannable code 142. A customer 128 may use the device 156 (e.g., a smartphone) to scan the code 142. The code 142 may include information, such as a name of the restaurant 132, a location of the restaurant 132, and other restaurant-related information.

Scanning the code 142 may cause the device 156 to determine whether the app 162 is installed on the device 156. The app 162 may be associated with the restaurant 132. For example, if the restaurant 132 is part of a particular restaurant chain, then the app 162 may be associated with the particular restaurant chain. If the app 162 is not installed, the device 156 may automatically navigate to a software store (e.g., app store) and ask the customer 128 whether to install the app 162 on the device 156. If the customer 128 indicates to install the app 162, then the device 156 may install the app 162, identify the location of the restaurant 132 based information included in the code 142, open a menu 140 in the app 162, and enable the customer 128 to place an order with the restaurant 132. If the app 162 is already installed, scanning the code 142 using the device 156 may cause the app 162 to automatically open, automatically select the restaurant 132 based on the location specified by the code 142, and automatically display the menu 140 to enable the customer 128 to place an order. If the app 162 is not installed on the device 156 and if the customer 128 indicates that the app 162 is not to be installed, then the device 156 may automatically open a browser 164 and navigate to a website of the restaurant 132 to enable the customer 128 to place an order.

In some aspects, the order post 104 may include the interface 144. The interface 144 uses a wireless technology, such as, for example, a cellular technology (e.g., code division multiple access (CDMA), global system for mobile (GSM), universal mobile telephone system (UMTS), or the like), Wi-Fi, Bluetooth, another type of wireless technology, or any combination thereof, to communicate with the server 106 via the network 108. The interface 144 may enable the order post 104 to communicate (e.g., via the network 108) with one of the software agents 116 on the server 106. For example, one of the software agents 116 may interact with a customer 128 to take an order.

The customer 128 may place an order by speaking towards the order post 104. In some cases, the order post 104 may respond to a "wake word" (Domino, Chick-fill, or the like) or "wake phrase" ("I'd like to order" or "I'd like to place an order") that, when spoken by the customer 128, causes the order post 104 to enter into an order-taking mode. The order post 104 may capture utterances 115 of the customer 128 using the microphone array 146. The microphone array 146 may include one or more microphones positioned in such a way that utterances from customers located in vehicles having different heights and located different distances from the order post 104 may be captured. For example, one of the microphones in the microphone array 146 may be used to capture ambient sounds in the surrounding area for noise cancellation purposes and used to remove noise from the audio captured by a remainder of the microphones in the microphone array 146. To illustrate, a phase of the audio (e.g., noise) captured by one of the microphones may be inverted (e.g., 180 degrees out of phase) relative to a phase of the audio captured by the remaining microphones to provide noise cancellation. In some cases, the audio may be filtered prior to inverting the phase. For example, in some aspects, a filter may be used to filter out voice frequencies in the phase of the non-voice frequencies may be inverted and mixed with the audio captured by the remaining microphones. In some aspects the digital signal processing module (DSP) module 148 may be used to modify frequencies and/or a phase of the audio captured by the microphone array 146 for better understanding of the utterances 115 by the AI engines 110 (e.g., by a speech detect engine). For example, the DSP module 148 may be used to perform noise cancellation. Thus, the DSP module 148 may modify the audio received by the microphone array 146 to increase machine intelligibility (e.g., rather than human intelligibility). The speaker 150 may be used to provide audio output of the responses 113 from the software agent 116.

In some cases, the order post 104 may include sensors 152 to detect the presence of a vehicle (e.g., determine when a vehicle is within a pre-determined distance of the order post) and/or enable the order post 104 to function as an autonomous vehicle and move from one vehicle to a next vehicle in an area (e.g., parking lot, drive-through, or the like). For example, the sensors to detect the presence of the customer 128 may include a camera, a directional Bluetooth sensor, a mass sensor, another type of sensor, or any combination thereof. In some cases, the camera may take a picture of the license plate of a vehicle in which the customer 128 is located and, if the customer 128 has previously given permission, look up the license plate to identify the customer 128.

In some aspects, the order post 104 may include the display device 154. The display device 154 may be used to display items from the menu 140, items that the customer 128 previously ordered (if the customer 128 is recognized), upsell items (e.g., display a hot item, such as a piece of pie or a cup of hot cider, when the weather is cold or display a cold item, such as an ice cream sundae or a milkshake, when the weather is hot), and the like. In some cases, the display device 154 may be touch sensitive and may be capable of receiving input 168 from the customer 128. For example, the customer 128 may place an order using a combination of the utterances 115 and the input 168.

In some cases, the order post 104 may include a status indicator 307. For example, the status indicator 307 may display green to indicate that the order post 104 is available to take an order and that the customer may drive the vehicle near the order post 104. The status indicator 307 may display yellow to indicate that the order post 104 is busy taking an order from a customer. The status indicator 307 may display a red to indicate that the order post 104 needs servicing.

In some cases, one of the AI engines 110 may perform traffic management by (i) directing vehicles to particular order posts 104, (ii) directing vehicles to a pick-up window to pick up an order, (iii) activate and deactivate the order posts 104 based on an amount of traffic, or any combination thereof. In such cases, the status indicator 307 may be used in a manner similar to how vehicles are directed through a car wash, e.g., green may indicate that a vehicle is to proceed to a next location, such as pickup window, red may indicate that the vehicle is to stop next to the order post 104 to place an order, and yellow may indicate that the vehicle is to proceed with caution, e.g., due to the presence of a large number of vehicles in the area, to the next location (e.g., pickup window).

The order posts 104 may, in some cases, include a payment capture 314 module, such as a "tap to pay" that uses near field communication to obtain credit card data when a credit card is held in close proximity to the payment capture 314 module. The order posts 104 may include a scanner 316 to scan a promotional (e.g., coupon) code, such as a QR code. For example, a customer may hold a paper coupon (e.g., with a promotional code) or a promotional code displayed on a smartphone (e.g., the device 156 of FIG. 1) near the scanner 316. The order post 104 may use the scanner 316 to scan the promotional code to take advantage of a promotion, such as a free item, discount, or the like.

In some aspects, the AI engines 110, the NLP pipeline 112, and the like may execute on at least one of the order posts 104. In such cases, one of the software agents 116 executing on a particular one of the order posts 104 may take an order and communicate the order to the restaurant 132. In this way, the order posts 104 may perform order processing at the edge, without involving the server 106. The advantage of such an arrangement is that a local area network (LAN), such as a Wi-Fi network or the like, that includes the order posts 104 and the restaurant 132 is able to process orders, e.g., without using a wide area network (WAN). Such a system may be deployed where a WAN is unavailable, provides intermittent connectivity, or is cost prohibitive.

A particular restaurant may deploy different types of order posts. For example, a first type of order post may include the scannable code 142 to enable customers to use the device 156 to place an order. A second type of order post may include the interface 144, the microphone array 146, the DSP 148, and the speaker 150 but may not include the display device 154 (e.g., to reduce costs). A third type of order post may include the interface 144, the microphone array 146, the DSP 148, the speaker 150, and the display device 154. Each of the different types of order posts may be either permanently installed or temporarily installed in a particular location. A particular restaurant may use one or more types of order posts, with some order posts being permanent while other order posts may be temporary.

Thus, a restaurant may deploy one or more order post such as the representative order post illustrated in FIG. 3. The restaurant may use permanently installed order posts, temporarily installed order posts, or a combination of both temporary and permanent order posts. Customers in vehicles that are lined up in a drive-through lane are able to place orders using the order posts, enabling the restaurant to process more orders in a shorter period of time (e.g., as compared to if the order posts were not present). Restaurants can thus decrease the time that customers wait in line, thereby increasing customer satisfaction, while increasing throughput and revenue. The restaurant can do so without hiring more employees, without asking employees to venture out in inclement weather, and without asking employees to venture out into an area with moving vehicles.

Figure 4:
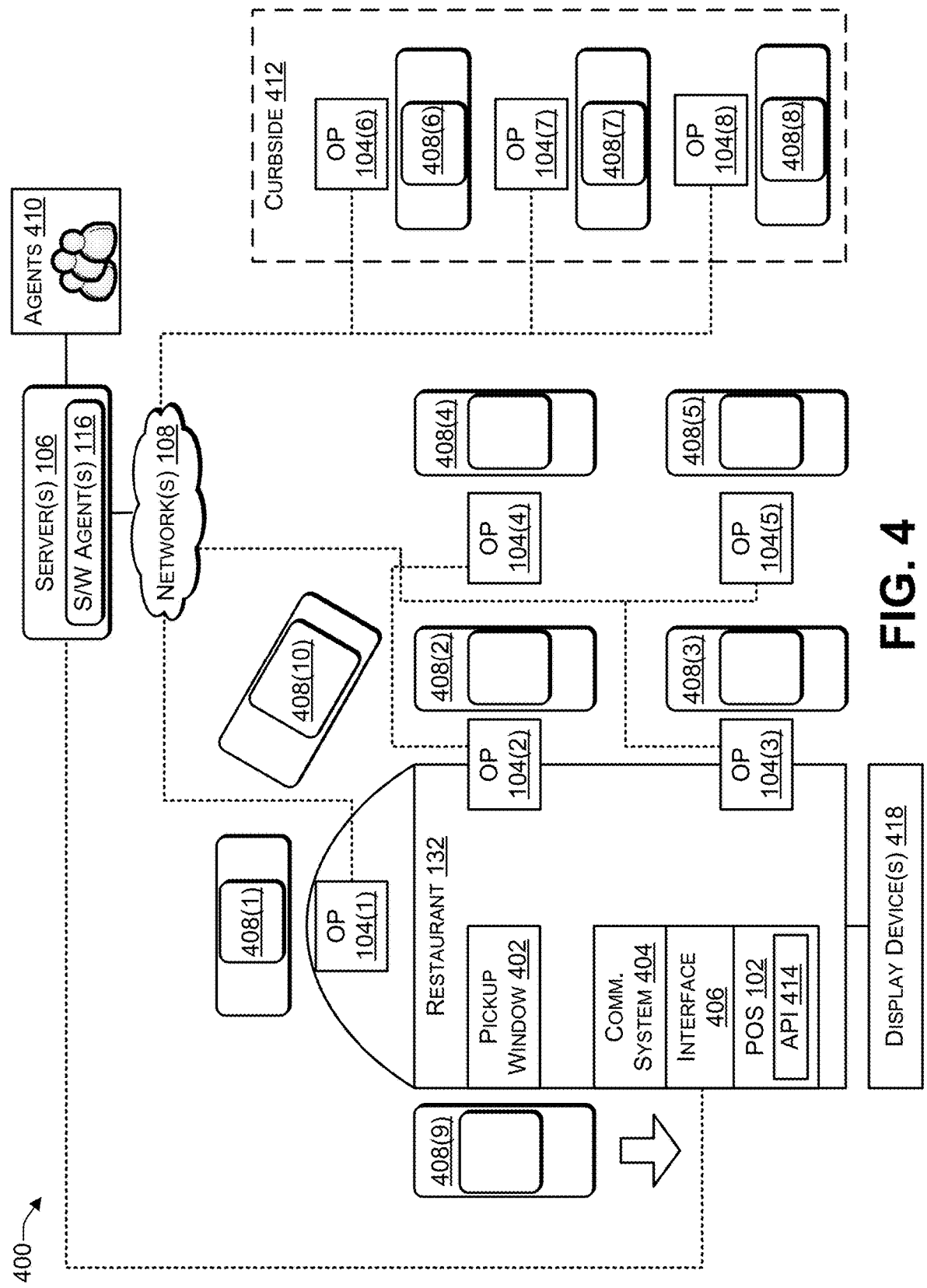
FIG. 4 is a block diagram illustrating order posts deployed in an area around a restaurant, according to some embodiments.

FIG. 4 is a block diagram 400 illustrating order posts deployed in an area (e.g., drive-through area and/or parking lot) around a restaurant, according to some embodiments. The restaurant 132 may have one or more pickup windows, such as a representative pickup window 402. The restaurant 132 may use a communication system 404 to enable employees to communicate with each other. For example, to use the communication system 404, each employee may wear a headset that includes a microphone and a speaker as well as a means for selecting particular employees with which to communicate. A communications interface 406 may interface between the communication system 404 and the server 106 hosting the software agents 116. Human agents 410 may be available in case an issue arises. For example, if an issue arises (e.g., software agent 116 cannot understand what the customer is saying) during a conversation between a customer and a software agent, the interface 406 may automatically escalate the issue by connecting the customer with one of the human agents 410. The communication system 404 may provide the human agent 410 contextual details associated with the order up to that point in time, such as which items are in the cart, what stage the order is in the order process, whether payment information has been provided, or the like. In this way, the human agent 410 resumes completing the order at the point where the order was transferred from the software agent 116 to the human agent 410, thereby avoiding frustrating the customer (e.g., the customer is not asked to start the order from the beginning). Each of the order posts 104 may, after receiving input (e.g., utterances and touch input), place a particular order with the restaurant 132 using an applications programming interface (API) 414 of the POS 102 system of the restaurant 132.

During peak times, such as around breakfast (6-10 AM), lunch (11 AM-1 PM), and dinner (4-8 PM), multiple vehicles 408 (e.g., 408(1), 408(2), 408(3), 408(4), 408(5), 408(6), 408(7), 408(8), 408(9), 408(10)) may be present in the area near the restaurant 132. Some of the vehicles, such as vehicles 408(1), 408(2), 408(3), 408(4), 408(5) maybe in a drive-through area and may have access to order posts 104(1), 104(2), 104(3), 104(4), 104(5), respectively. For example, the order posts 104(1), 104(2), 104(3) may be permanently fixed to a side of a building housing the restaurant 132 while the order posts 104(4), 104(5) may be temporarily located in the locations shown in FIG. 4. Of course, in other restaurants, zero or more of the order posts 104(1), 104(2), 104(3), 104(4), 104(5) may be permanently fixed at particular locations and zero or more of the order posts 104(1), 104(2), 104(3), 104(4), 104(5) may be temporarily located at particular locations.

The customer in the vehicle 408(9) is at the pickup window 402 to pick up a previously placed order. The customer in the vehicle 408(10) either (i) placed an order using one of the order posts 104(2), 104(3), 104(4), 104(5) and is waiting to go to the pickup window 402 or (ii) is waiting to place an order at the order post 104(1). One of the AI engines 110 of FIG. 1 may perform traffic management by (i) directing the vehicles 408 to particular order posts 104, (ii) directing the vehicles 408 to the pick-up window 402 to pick up an order, (iii) activate and deactivate the order posts 104 based on an amount of traffic, or any combination thereof. For example, some restaurants may include one or more display devices 418 (e.g., liquid crystal display (LCD), light emitting diode (LED) or the like) to enable one of the AI engines 110 to perform traffic management by displaying messages, such as "Order post N is available—vehicle with license plate XYZ, please proceed to order post N" (N>0), "Vehicle with license plate XYZ, your order is ready—please proceed to the pickup window." The display devices 418 may be sufficiently large that vehicles in the immediate vicinity (e.g., up to 15 feet from a sign) are able to view a particular one of the display devices 418.

In some cases, the restaurant 132 may set aside an area for curbside pickup 412, as shown in FIG. 4. Order posts 104(6), 104(7), 104(8) may be used by customers located in vehicles 408(6), 408(7), 408(8), respectively, to place orders with the software agents 116 or to pickup a previously placed order. Human employees may deliver the orders to the appropriate vehicles.

Thus, by using order posts (e.g., in permanently fixed locations, in temporary locations, or a combination of both), the restaurant can use the software agents 116 to receive orders from multiple customers in multiple vehicles substantially simultaneously. For example, as illustrated in FIG. 4, eight customers (e.g., in vehicles 408(1), 408(2), 408(3), 408(4), 408(5), 408(6), 408(7), 408(8)) may simultaneously place orders with the software agents 116 using the order posts 104(1), 104(2), 104(3), 104(4), 104(5), 104(6), 104(7), 104(8). The restaurant is able to significantly increase the number of orders that can be taken at the same time, thereby increasing throughput and revenue while decreasing the time a customer has to wait to place an order, thereby increasing customer satisfaction. In addition, the restaurant may not hire employees to go out into the drive-through or parking lot to take orders using a tablet, thereby saving the restaurant money.

FIG. 5 is a block diagram of a system 500 that includes an edge appliance 502, according to some embodiments. The edge appliance 502 may be placed, from a communications perspective, between one or more order posts 104 and the communication system 404 (e.g., used by the restaurant 132, as shown in FIG. 4).

The edge appliance 502 may include an interface 503(1) to communicatively couple with the one or more order posts 104 (e.g., using the interface 144 of each order post 104) and an interface 503(2) to communicatively couple with the communication system 404 (e.g., using the interface 406). The edge appliance 502 may include a network interface (I/F) 530 that enables the edge appliance 5022 to connect, via the networks 108, with the servers 106 that are hosting the software agents 116. The edge appliance 502 may include processors 504 and memory 506. In some cases, the edge appliance 502 may be capable of hosting the software agents 116. For example, if the restaurant 132 is located in an area where the available network access has limited bandwidth (or no connectivity), such that the software agents 116 hosted by the servers 106 have difficulties or are unable to engage in conversations with customers, such as a representative customer 128 (also referred to as a guest), then the edge appliance 502 may host the software agents 116. In this way, the edge appliance 502 may provide the software agents 116 without being connected to the servers 106 over the network 108 if the restaurant 132 is located in an area with limited (or zero) network access.

The edge appliance 502 may include one or more processors 504, a memory 506 to store instructions 508, analog-to-digital converters (ADC) 510(1), 510(2), and digital-to-analog converters (DAC) 512(1), 512(2). The ADC 510(1) may convert analog audio, e.g., output by the microphones 146, into digital audio data. The ADC 510(2) may convert the analog audio that is output by a microphone 514 that is included in the communication system 404 into digital audio data. The DAC 512(1) may convert digital audio data into analog audio that is output by the speaker 150 of the order post 104. The DAC 512(2) may convert digital audio data into analog audio that is output by a speaker 516 of the communication system 404. For example, an employee 518 (also referred to as a crew member) of the restaurant 132 may use the communication system 404 to communicate with the customer 128 who is at the order post 104. The instructions 508 are executable by the processors 504 to provide the software agents 116.

The edge appliance 502 may operate in one of multiple modes 520. For example, in a listen mode 522, the edge appliance 502 may listen in on the conversation 111 between the customer 128 and the employee 518, digitize the conversation 111 and transcribe the conversation 111 to create a transcription 536 that is stored as conversation data 136. In some cases, the edge appliance 502 may determine changes 538 to the cart 126 during the conversation 111 and store the conversation 111 along with the changes 538 to the cart 126 as the conversation data 136. For example, each turn of the conversation 111 may be correlated with each of the changes 538 to the cart 126 to enable the AI engines 110 to determine how the cart 126 changes during the conversation 111. After a sufficient quantity of the conversation data 136 has been gathered, the conversation data 136 is used to periodically retrain the AI engines 110 of FIG. 1 that underly the software agents 116. Each time a threshold amount of conversation data 136 has been gathered, the AI engines 110 may be retrained to improve the accuracy of the software agents 116. In this way, the accuracy of the software agents 116 can be improved by training them using actual order data that was gathered in listen mode 522. The audio 537 of the customer 128 and audio of the employee 518 may be separately recorded (e.g., a stereo signal or two mono signals). This may be done because the audio 537 may be used for improving automatic speech recognition (ASR), whereas audio of the employee 518 is not used for improving ASR. In some cases, the conversation data 136 may be initially stored on the edge appliance 502 and periodically uploaded to the server 106. For example, the conversation data 136 may be uploaded to the server 106 during off-hours (e.g., when the restaurant 132 is closed or during off-peak hours, such as between 2:00 AM and 5:00 AM or the like). In other cases, the conversation data 136 may be stored on the server 106 and not on the edge appliance 502. The transcript 536 of the conversation 111 is created substantially in real-time (e.g., less than one second after each word is spoken, each word is transcribed).

In an active mode 524, the software agent 116 engages in the conversation 111 with the customer 128. Both sides of the conversation, between the software agent 116 and the customer 128 are provided to the communication system 404. For example, the utterances 115 of the customer 128 are picked up by the microphones 146 and (1) provided to the software agent 116 and (2) output via the speaker 516 of the communication system 404. The response(s) 113 of the software agent 116 are output via the speaker 150 to the customer 128 and output via the speaker 516 of the communication system 404. Of course, the appropriate digital-to-analog and analog-to-digital conversions are performed by the ADC 510 and DAC 512. In this way, the employee 518 is able to listen in to the communication 111, including the utterances 115 of the customer 128 and the responses 113 provided by the software agent 116. If the employee 518 determines that the software agent 116 is unable to proceed further in the conversation 111, then the employee 518 may begin to speak into the microphone 514. For example, if the software agent 116 is unable to understand one of the utterances 115 even after asking the customer 128 to repeat the utterance, then the employee 518 may begin speaking into the microphone 514. In response to detecting the voice of the employee 518, the edge appliance 502 may automatically switch from the active mode 524 to an override mode 526. In the override mode 526, the software agent 116 disengages from the conversation 111 with the customer 128 and the employee 518 engages in the conversation 111 with the customer 128. In this way, the employee 518 takes over from the software agent 116 if the employee 518 determines that the software agent 116 is unable to complete taking the order.

In some cases, those of the conversations 111 that are interesting may be uploaded to the server 106 and used to re-train the machine learning algorithm underlying the software agents 116. For example, any conversation 111 during which the employee 518 takes over (e.g., transitioning the edge appliance 502 from the active mode 524 to the override mode 526) may be considered interesting. By re-training the software agents 116, such situations where the employee 518 takes over from the software agent 116 may be avoided in the future.

If the edge appliance 502 encounters a hardware or software issue and is unable to provide the software agents 116, then the edge appliance 502 may operate in a bypass mode 528. For example, if there is a power failure or one of the hardware or software components of the edge appliance 502 fails, then the edge appliance 502 may be unable to provide the software agents 116 to engage in the conversation 111 with one of the customers 128. In such cases, the edge appliance 502 automatically transitions to the bypass mode 528. In the bypass mode 528, the output of the microphones 146 is routed to the speaker 516 (e.g., bypassing the ADC 510 and DAC 512) and the output of the microphone 514 is routed to the speaker 150 (e.g., bypassing the ADC 510 and DAC 512). In this way, if the edge appliance 502 is unable to provide the software agents 116, the restaurant 132 can still function and employees, such as the representative employee 518, are able to take orders from customers, such as the representative customer 128.

The edge appliance 502 may interface between the order posts 104 and the communication system 404, including receiving, mixing, and managing audio streams provided by the microphones 146, 514 and output via the speakers 150, 516. The edge appliance 502 may receive audio from the text-to-speech module 228 of FIG. 2. The edge appliance may either transmit audio streams to the servers 106 for automatic speech recognition (ASR) or process the audio streams locally, using the speech-to-text 206 of FIG. 2 that may be executing on the servers 106, on the edge appliance 502, or both. The edge appliance 502 may use Web sockets and application programming interfaces (APIs) to control connectivity to the network 108 and the servers 106. The edge appliance 502 may manage audio signal mixing, muting, and volume adjustments in software stored in the instructions 508. The bypass mode 528 may be a default mode that provides "pass-thru" of audio signals if the edge appliance 502 fails or if there is a loss of connectivity between the edge appliance 502 and the server 106. For example, if there is a loss of power or loss of connectivity, then the edge appliance 502 may automatically transition to the bypass mode 528. The edge appliance 502 may provide a physical switch to enable the employee 518 to manually place the edge appliance 502 in the bypass mode 528. The edge appliance 502 may enable remote monitoring, remote software updating, and software management from a centralized location that is at a different location from the restaurant 132.

The sensors 152 may include sensors (e.g., cameras, mass sensors, motion sensors, or the like) to detect the presence of a vehicle in a drive-through lane. The edge appliance 502 may receive the sensor data from the sensors 152 and provide it to the software agents 116 executing on the edge appliance 502 or on the servers 106. The sensor data from the sensors 152 may initiate the conversation 111 to receive an order. The sensors 152 may detect the departure of a vehicle from the drive-through lane and cause the edge appliance 502 to determine that the conversation 111 has ended.

The employee 518 or the call center agents 410 may cause the edge appliance 502 to transition from the active mode 524 to the override mode 526. The employee 518 or the call center agents 410 are able to listen in to the conversation 111 between the customer 128 and the software agent 116. In this example, the employee 518 (or one of the call center agents 410) listening in to the conversation 111 between the customer 128 and one of the software agents 116 determines the need for human intervention and can cause the mode 520 to transition from active mode 524 to override mode 526. For example, Voice Activity Detect (VAD) on the microphone 514 used by the employee 518 may cause the mode 520 to transition from active mode 524 to override mode 526 and may result in the audio output of the software agent 116 being muted. In this way, the employee 518 may converse directly with the customer 128. The audio from the employee 518 and the customer 128 is captured (similar to listen mode 522) to enable further training for the AI engines 110. By performing an analysis of conversations between the customer 128 and the software agent 116 in which the employee 518 took over, the software agent 116 can be re-programmed and/or re-trained to handle such conversations in the future. In some cases, if the software agent 116 is unable to proceed further (e.g., stuck in a loop asking for clarification), then software agent 116 may send a notification to the employee 518 or the call center agents 410 requesting that they join the call. In such cases, the employee 518 or one of the call center agents 410 may instruct the edge appliance 502 to transition the customer's call from the active mode 524 to the override mode 526. In other cases, the employee 518 or one of the call center agents 410 may listen in on the conversation 111 between the customer 128 and the software agent 116 and determine whether to take over from the software agent 116 (e.g., by instructing the edge appliance 502 to transition the customer's call from the active mode 524 to the override mode 526).

In some cases, the software agent 116 may determine that the software agent 116 is unable to proceed further in the conversation 111 and automatically signal the employee 518 (or one of the call center agents 410 of FIG. 4) to engage with the customer 128 and cause the edge appliance 502 to switch from the active mode 524 to the override mode 526. In some cases, in bypass mode 528, the audio of the conversation 111 between the customer 128 and the employee 518 may be captured as the audio 537 and stored and used to re-train the AI engines 110.

If the connection to the network 108 is sufficient to support communications, the software agents 116 may be executed on both the server 106 and the edge appliance 502. For example, during peak hours or other times during which the restaurant 132 receives a significant amount of orders (e.g., greater than a threshold amount of orders received per minute), then the software agents 116 may execute on both the server 106 and the edge appliance 502. The edge appliance 502 may automatically decide, based on the volume of orders being received (e.g., orders received per minute) and the ability of the network interface 530 to connect to the server 106, where the software agents 116 will execute. For example, if the volume of orders exceeds a threshold and the network interface 530 indicates connectivity is good, then both the edge appliance 502 and the server 106 may execute software agents 116. If (i) the volume of orders does not exceed the threshold or (ii) the network interface 530 indicates connectivity is poor or non-existent, then the edge appliance 502 may execute the software agents 116 but the server 106 may not execute the software agents 116.

Thus, an edge appliance may provide an interface between multiple order posts and a communication system for a restaurant. The edge appliance may receive multiple communication signals from each order post, including, for example, audio signals from microphones in each order post, vehicle sense data from vehicle sensors in each order post, order information input using a touchscreen display device in each order post, and the like. The edge appliance may output to each order post, a response from an employee or a software agent via a speaker in each order post, information about a customer's order displayed on a display device in each order post, and the like. In a default mode, also known as a bypass mode, the edge appliance may relay signals from the order post to the communication system and relay signals from the communication system to the order post. The edge appliance may automatically enter the bypass mode if power to the edge appliance shuts off, if a communication interface is unable to communicate with servers, or under other predetermined situations. The edge appliance may include a communication interface to enable the edge appliance to connect to a server that hosts software agents that can be used to engage in conversations to take orders from customers. In some cases, the edge appliance may include the capability of hosting the software agents. For example, the edge appliance may communicate with the server hosting the software agents and if the connection to the server is interrupted or encounters network/bandwidth issues, the edge appliance may initiate execution of the software agents on the edge appliance and disconnect from the server. In a listen mode, the edge appliance may listen to the conversation between a customer at an order post and an employee and monitor with changes to the cart associated with the order being placed the edge appliance may store the conversation data and the changes to the cart as training data. The conversation data in the cart data may be used to train AI engines that underlie the software agents. In an active mode, the software agents (e.g., either executing on the edge appliance or on a server that is connected via a network to the edge appliance) may engage in conversations to take orders from customers. An employee may listen in on one or more the conversations and, if the employee determines that the software agent is unable to complete taking the order, then the employee may begin speaking directly with the customer. The edge appliance may detect that the employee's microphone is receiving audio, automatically transition the edge appliance from the active mode to an override mode, disengage the software agent from the conversation with the customer, and enable the employee to complete the order.

Figure 6:
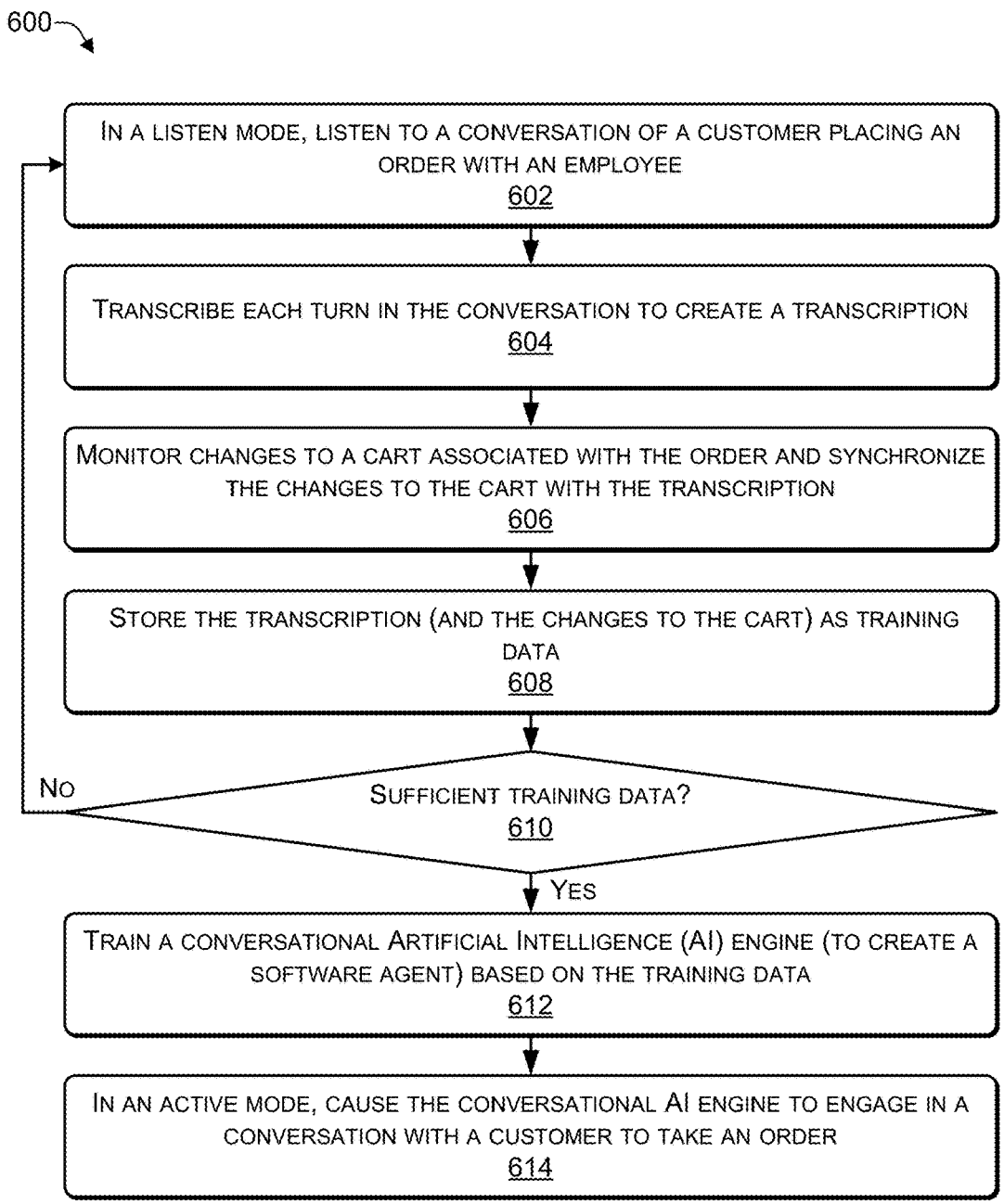
FIG. 6 is a flowchart of a process that includes storing a transcription of a conversation and changes to a card, according to some embodiments.
Figure 7:
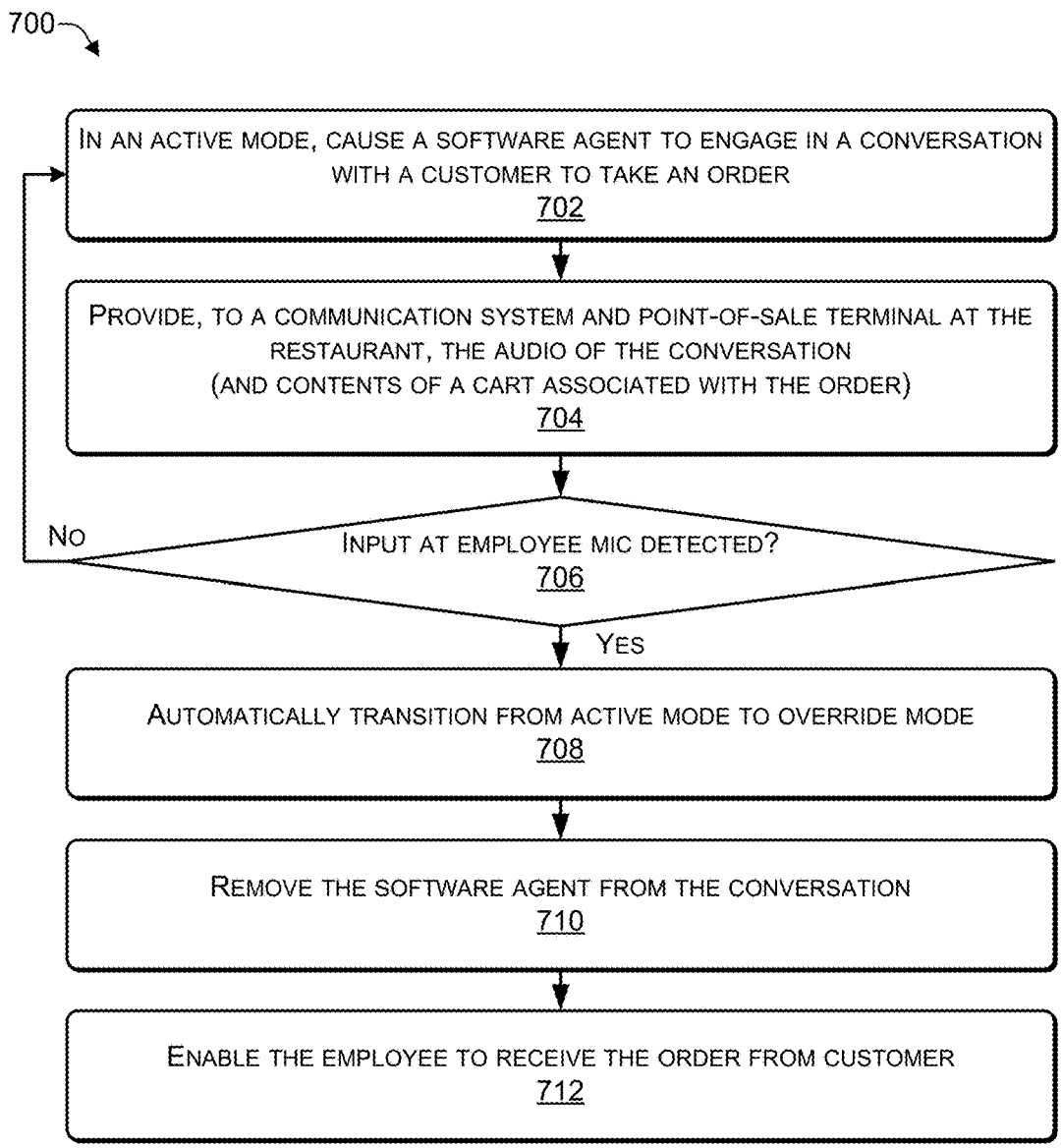
FIG. 7 is a flowchart of a process that includes automatically transitioning from an active mode to an override mode, according to some embodiments.
Figure 8:
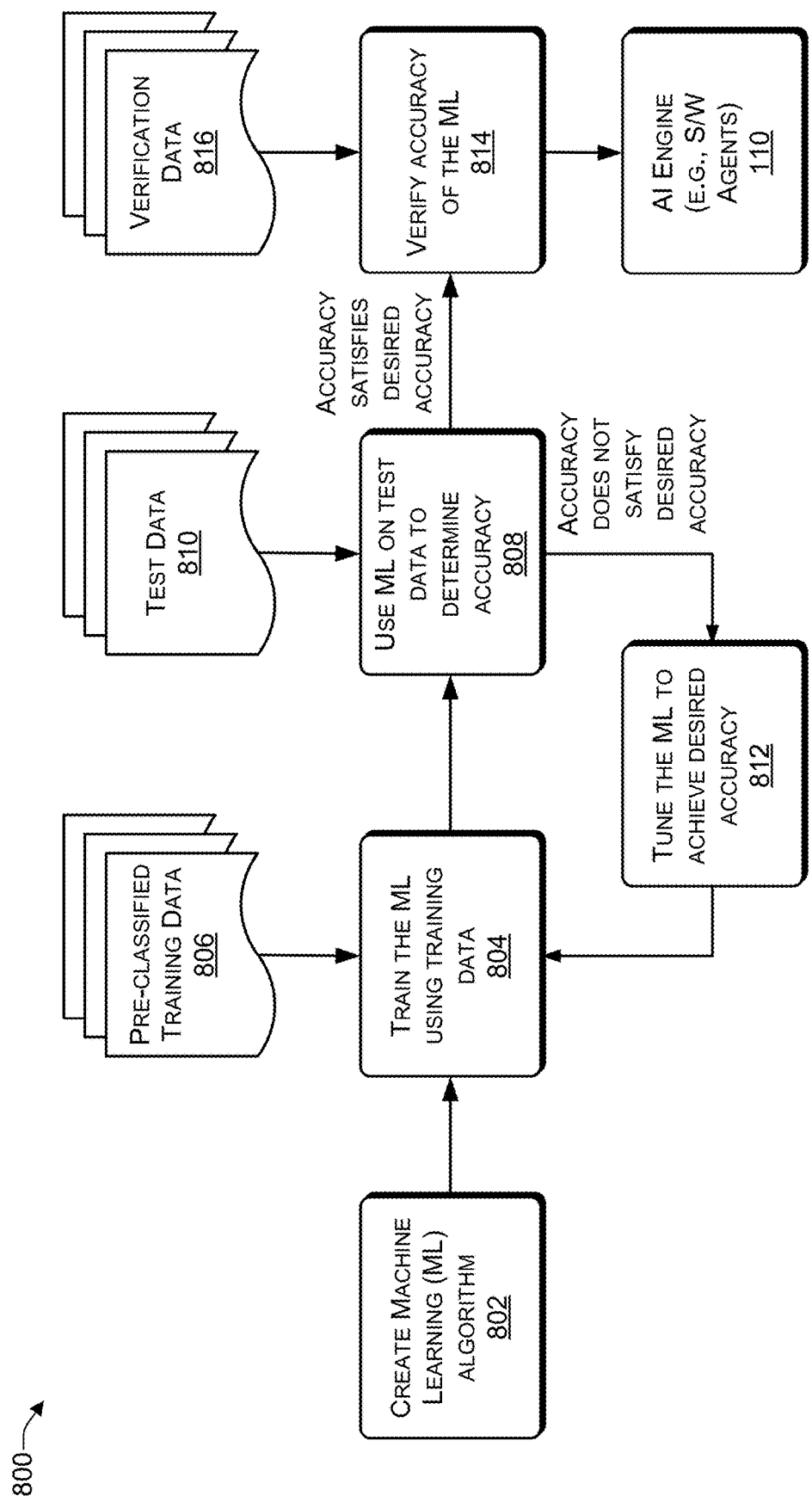
FIG. 8 is a flowchart of a process to transition from an active mode to an override mode, according to some embodiments.

In the flow diagrams of FIGS. 6, 7, and 8 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600, 700, and 800 are described with reference to FIGS. 1, 2, 3, 4, and 5 as described above, although other models, frameworks, systems and environments may be used to implement this process.

FIG. 6 is a flowchart of a process 600 that includes storing a transcription of a conversation and changes to a card, according to some embodiments. The process 600 may be performed by the edge appliance 502 of FIG. 5.

At 602, in a listen mode, the edge appliance may listen to a conversation of a customer placing an order with an employee. At 604, the edge appliance may transcribe each turn in the conversation to create a transcription. At 606, the edge appliance may monitor changes to a cart associated with the order and synchronize the transcription with the changes to the cart. At 610, the edge appliance stores the transcription (and may store the changes to the cart) as training data. For example, in FIG. 5, in the listen mode 522, the edge appliance 502 captures the audio from the microphones 146, 514 associated with the conversation 111 between the customer 128 and the employee 518 and transcribes the audio to create transcriptions 536. The edge appliance 502 may monitor the cart 126 and may monitor the changes 538 to the cart 126. The edge appliance 502 may synchronize the transcription 536 and the changes 538 to the cart 126. For example, if the customer 128 says "I'd like to order <item 1>" and subsequently item 1 is placed in the cart 126, then the edge appliance 502 may synchronize the transcript with the changes to the cart. The edge appliance 502 may store the transcriptions 536 (and in some cases the changes 538 to the cart) in the storage device 532 of the edge appliance 502.

At 610, the edge appliance determines whether there is sufficient training data. If the edge appliance determines, at 610, that there is insufficient training data, then the process may proceed back to 604, where the edge appliance may listen to additional conversations between an employee and a customer placing an order. If the edge appliance determines, at 610 that there is sufficient training data, then the process proceeds to 612, where the edge appliance trains a conversational AI engine (e.g., used for a software agent) based on the training data. For example, in FIG. 5, if the edge appliance 502 determines that the conversation data 136 is sufficient (e.g., satisfies a threshold amount) to train the AI engine 110, then the AI engine 110 may be trained, as described in FIG. 8. The trained AI engine 110 is used as one of the software agents 116.

At 614, in an active mode the edge appliance may cause the conversational AI engine to engage in a conversation with the customer to take an order. For example, in FIG. 5, in the active mode 524, the software agents 116, either hosted by the edge appliance 502 or by the servers 106, may engage in the conversation 111 to take an order from the customer 128.

Thus, in a listen mode, an edge appliance may listen to conversations between customers and employees. The edge appliance may gather data, including the conversations, transcriptions of the conversations, and, in some cases, changes to carts associated with orders being placed, and store the data in storage. The stored data may be used to train a conversational AI engine (e.g., used to implement a software agent) to take orders from a customer.

FIG. 7 is a flowchart of a process 700 that includes automatically transitioning from an active mode to an override mode, according to some embodiments. The process 700 may be performed by the edge appliance 502 of FIG. 5.

At 702, the edge appliance, in an active mode, causes a software agent to engage in a conversation with the customer to take the customer's order. For example, in FIG. 5, in response to receiving sensor data from one of the sensors 150 to indicating that a vehicle is near the order post 104, the edge appliance 502 may assign one of the software agents 116 to engage in the conversation 111 with the customer 128. The software agents 116 may be executing (1) on the edge appliance 502 or (2) on the server 106 that is connected to the edge appliance 502 via the networks 108. In the active mode, the output of the microphones 146 is digitized, processed through the natural language processing pipeline 112 of FIGS. 1 and 2, and provided to one of the software agents 116. The software agent 116 responds with the dialog response 220 that is converted into speech using the text-to-speech 228 of FIG. 2 and output to the customer 128 via the speaker 150 of the order post 104.

At 704, the edge appliance provides the audio of the conversation to a communication system at the restaurant and may provide the cart associated with the order to a point-of-sale terminal. For example, in FIG. 5, the audio from the microphones 146 and the audio output by the software agent 116 is provided to the communication system 404 for output via the speaker 516. In addition, the software agent 116 may make updates to the cart 126 which the employee 518 can view via the POS 102. In this way, the employee 518 can listen to the conversation 111 between the customer 128 and the software agent 116 and, in some cases, view the cart 126 to determine how the conversation between the customer 128 and the software agent 116 is proceeding, e.g., whether the conversation is proceeding smoothly or whether the software agent 116 has encountered an issue such that the software agent 116 is unable to proceed further to complete the order.

At 706, the edge appliance detects whether audio input is present at an employee microphone. If the edge appliance determines, at 706, that no input was detected at the employee microphone, then the process proceeds to 702, where the software agent continues to engage in the conversation with the customer. If the edge appliance determines, at 706 that input was detected at the employee microphone then the process proceeds to 708, where the edge appliance automatically transitions from an active mode to an override mode. At 710, the edge appliance removes the software agent from the conversation. At 712, the edge appliance enables the employee to receive a remainder of the order from the customer. For example, in FIG. 5, the edge appliance 502 monitors the microphone 514 of the communication system 404. If the edge appliance 502 detects audio input (e.g., from the employee 518 or one of the call center agents 410) at the microphone 514, then the edge appliance 502 may automatically transition from the active mode 524 to the override mode 526, remove the software agent 116 from the conversation 111, and enable the employee 518 to continue the conversation 111 with the customer 128 to complete the order.

Thus, in an active mode, software agents may engage with customers to receive each customer's order. An edge appliance enables employees (or other agents of the restaurant) to listen in to the conversations between the software agents and the customers. If the employee determines that the software agent has encountered an issue and is unable to complete taking the customer's order, then the employee may begin speaking directly to the customer. The edge appliance detects when the employee began speaking and automatically transitions the edge appliance from the active mode to an override mode, in which the employee overrides the software agent. After transitioning from the active mode to the override mode, the edge appliance removes the software agent from the conversation and enables the employee to complete the conversation with the customer. One of the advantages of this is that the employee can immediately step in to the conversation and complete the order without having to start from scratch. In a conventional system, if a software agent encounters an error while taking an order from customer, the customer is transferred to an employee and is asked to start from the beginning to place the order. In such a conventional system, customers get frustrated because they may have almost completed their order with the software agent and are forced to provide their entire order again to the employee. In contrast, using the edge appliance in override mode, the contents of the cart (e.g., the cart that the software agent has been using for the order) are visible on a point-of-sale terminal to which the employee has access, thereby enabling the employee to see a current state of the cart, including items added to the cart by the software agent, and is able to complete the order without having to ask the customer to start from the beginning. In this way, customer satisfaction is increased by not having the customer start the order from the beginning.

FIG. 8 is a flowchart of a process 800 to train a machine learning algorithm (e.g., to create the AI engines 110 and the software agents 116), according to some embodiments. The process 700 may be performed by a server, such as the server 106 of FIGS. 1, 2, 3, 4, and 5, to train the encoder 210, the dish classifier 214, the intent classifier 213, and the dialog model 218.

At 802, the machine learning algorithm (e.g., software code) may be created by one or more software designers. At 804, the machine learning algorithm may be trained using pre-classified training data 806 (e.g., a portion of the conversation data 136 that has been pre-classified). For example, the training data 806 may have been pre-classified by humans, by machine learning, or a combination of both. After the machine learning has been trained using the pre-classified training data 806, the machine learning may be tested, at 808, using test data 810 to determine an accuracy of the machine learning. For example, in the case of a classifier (e.g., support vector machine), the accuracy of the classification may be determined using the test data 810 (e.g., a portion of the conversation data 136 that has been pre-classified).

If an accuracy of the machine learning does not satisfy a desired accuracy (e.g., 95%, 98%, 99% accurate), at 808, then the machine learning code may be tuned, at 812, to achieve the desired accuracy. For example, at 812, the software designers may modify the machine learning software code to improve the accuracy of the machine learning algorithm. After the machine learning has been tuned, at 812, the machine learning may be retrained, at 804, using the pre-classified training data 806. In this way, 804, 808, 812 may be repeated until the machine learning is able to classify the test data 810 with the desired accuracy.

After determining, at 808, that an accuracy of the machine learning satisfies the desired accuracy, the process may proceed to 814, where verification data 816 (e.g., a portion of the conversation data 136 that has been pre-classified) may be used to verify an accuracy of the machine learning. After the accuracy of the machine learning is verified, at 814, the machine learning 130, which has been trained to provide a particular level of accuracy may be used.

The process 800 may be used to train each of multiple machine learning algorithms (e.g., classifiers) described herein, such as the encoder 210, the dish classifier 214, the intent classifier 213, the dialog model 218, the AI engines 110, and the software agents 116.

Figure 9:
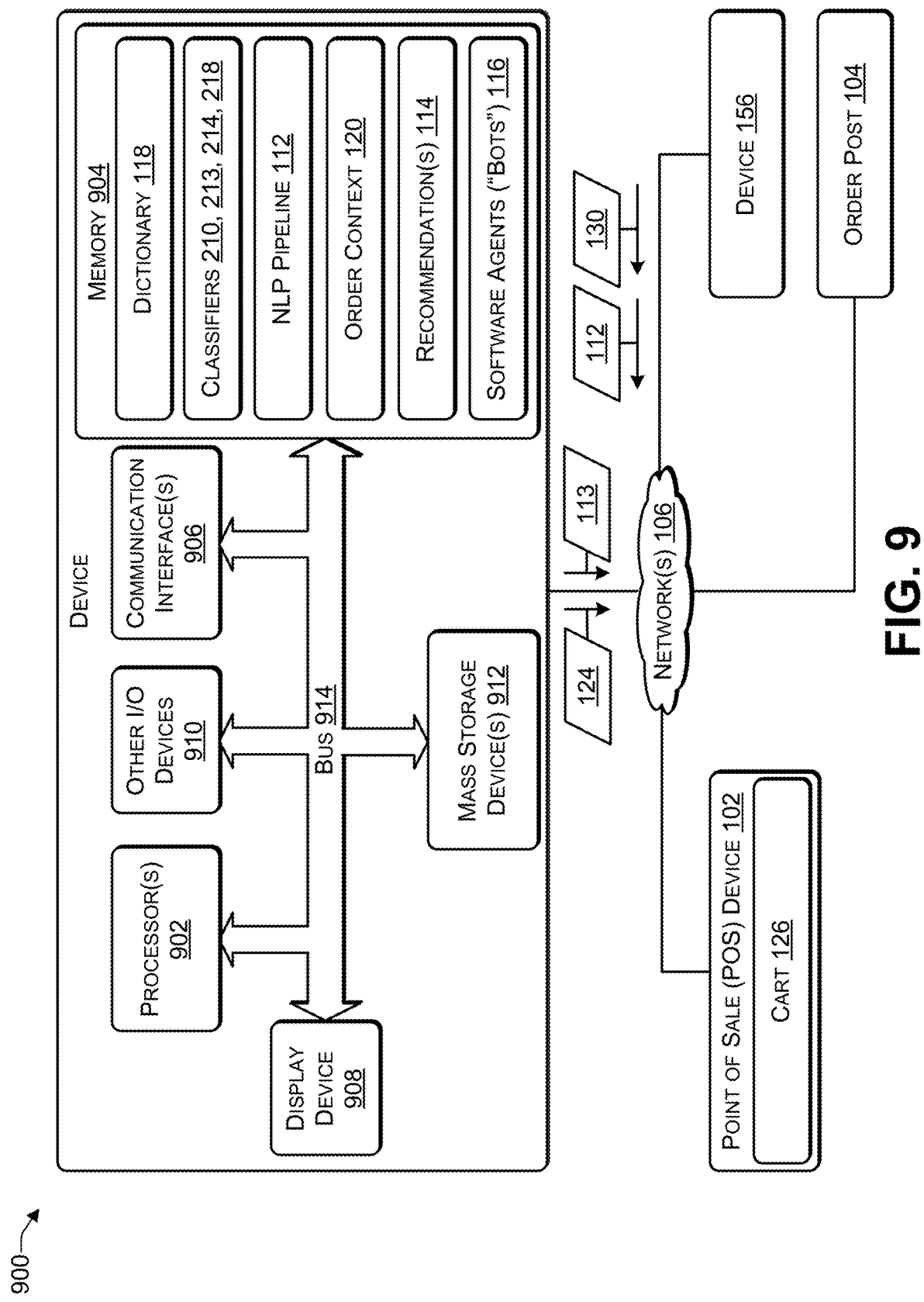
FIG. 9 illustrates an example configuration of a computing device that can be used to implement the systems and techniques described herein.

FIG. 9 illustrates an example configuration of a device 900 that can be used to implement the systems and techniques described herein, such as for example, the computing devices 102, the consumer device 156, and/or the server 106 of FIG. 1, the order posts 104, or the edge appliance of FIG. 5. For illustration purposes, the device 900 is shown in FIG. 9 as implementing the server 106 of FIG. 1.

The device 900 may include one or more processors 902 (e.g., central processing unit (CPU), graphics processing unit (GPU), or the like), a memory 904, communication interfaces 906, a display device 908, other input/output (I/O) devices 910 (e.g., keyboard, trackball, and the like), and one or more mass storage devices 912 (e.g., disk drive, solid state disk drive, or the like), configured to communicate with each other, such as via one or more system buses 914 or other suitable connections. While a single system bus 914 is illustrated for ease of understanding, it should be understood that the system buses 914 may include multiple buses, such as a memory device bus, a storage device bus (e.g., serial ATA (SATA) and the like), data buses (e.g., universal serial bus (USB) and the like), video signal buses (e.g., Thunder-Bolt®, digital video interface (DVI), high definition multimedia interface (HDMI), and the like), power buses, etc.

The processors 902 are one or more hardware devices that may include a single processing unit or a number of processing units, all of which may include single or multiple computing units or multiple cores. The processors 902 may include a graphics processing unit (GPU) that is integrated into the CPU or the GPU may be a separate processor device from the CPU. The processors 902 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 902 may be configured to fetch and execute computer-readable instructions stored in the memory 904, mass storage devices 912, or other computer-readable media.

Memory 904 and mass storage devices 912 are examples of computer storage media (e.g., memory storage devices) for storing instructions that can be executed by the processors 902 to perform the various functions described herein. For example, memory 904 may include both volatile memory and non-volatile memory (e.g., RAM, ROM, or the like) devices. Further, mass storage devices 912 may include hard disk drives, solid-state drives, removable media, including external and removable drives, memory cards, flash memory, floppy disks, optical disks (e.g., CD, DVD), a storage array, a network attached storage, a storage area network, or the like. Both memory 904 and mass storage devices 912 may be collectively referred to as memory or computer storage media herein and may be any type of non-transitory media capable of storing computer-readable, processor-executable program instructions as computer program code that can be executed by the processors 902 as a particular machine configured for carrying out the operations and functions described in the implementations herein.

The device 900 may include one or more communication interfaces 906 for exchanging data via the network 110. The communication interfaces 906 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 906 can also provide communication with external storage, such as a storage array, network attached storage, storage area network, cloud storage, or the like.

The display device 908 may be used for displaying content (e.g., information and images) to users. Other I/O devices 910 may be devices that receive various inputs from a user and provide various outputs to the user, and may include a keyboard, a touchpad, a mouse, a printer, audio input/output devices, and so forth.

The computer storage media, such as memory 116 and mass storage devices 912, may be used to store software and data, including, for example, the dictionary 118, the classifiers 210, 213, 214, 218, the NLP pipeline 112, the order context 120, the recommendations 114, and the software agents 116.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An edge appliance comprising:
   an order post interface to connect to one or more order posts;
   a communication interface to connect to:
      a communications system of a restaurant; and
      a point-of-sale terminal of the restaurant;
   one or more processors; and
   a memory device to store instructions executable by the one or more processors to perform operations comprising:
      based at least in part on determining that the edge appliance is in a listen mode:
         capturing conversation data between a set of customers and one or more employees of the restaurant;
         transcribing individual conversations in the conversation data to create a set of transcriptions;
         storing the set of transcriptions to create training data; and
         training a conversational artificial intelligence algorithm using the training data to create a software agent;
      based at least in part on determining that the edge appliance is in an active mode;
         causing the software agent to engage in an additional conversation to take an order from an additional customer using a particular order post of the one or more order posts and wherein the software agent is executed by one of:
            the one or more processors of the edge appliance; or
            a server that is connected to the edge appliance via a network;
         providing, using the communication interface, audio data that includes the additional conversation to the communications system;
         providing, using the communication interface, a content of a cart associated with the order to the point-of-sale terminal;
         based at least in part on determining, using the communication interface, that a microphone of the communication system is receiving audio input from a particular employee of the one or more employees of the restaurant:
            automatically, without human interaction, transitioning the edge appliance to an override mode; and
            enabling the particular employee to receive a remainder of the order from the additional customer; and
      based at least in part on determining that the edge appliance is unable to provide the software agent:
         automatically transitioning the edge appliance to a bypass mode;
         routing an output of an order post microphone of the order post to a speaker of the communication system;
         routing the output of the microphone of the communication system to an order post speaker of the order post; and
         enabling the particular employee to receive the remainder of the order from the additional customer.

2. The edge appliance of claim 1, the operations further comprising:
   after enabling the particular employee to receive the remainder of the order from the additional customer, removing the software agent from the additional conversation with the additional customer.

3. The edge appliance of claim 1, the operations further comprising:
   based at least in part on determining that the edge appliance is in the override mode:
      determining that the edge appliance is able to provide the software agent; and
      automatically transitioning the edge appliance to the active mode.

4. The edge appliance of claim 1, wherein storing the set of transcriptions to create the training data comprises:
   transferring at least a portion of the set of transcriptions to the server.

5. The edge appliance of claim 1, wherein the software agent engaging in the additional conversation with the additional customer to take the order from the additional customer comprises:
   receiving, by the software agent, an utterance from the additional customer;
   predicting, using the conversational artificial intelligence algorithm, a response to the additional customer based at least in part on the utterance; and
   providing the response to the additional customer.

6. The edge appliance of claim 1, wherein training the conversational artificial intelligence algorithm using the training data to create the software agent comprises:
   determining that an amount of the training data satisfies a training data threshold;
   training the conversational artificial intelligence algorithm using the training data to create the software agent; and
   transitioning the edge appliance to the active mode.

7. The edge appliance of claim 1, wherein an individual order post of the one or more order posts comprises:
   the order post speaker;
   one or more sensors;
   one or more order post processors;
   an order post memory device to store order post instructions executable by the one or more order post processors to perform order post operations comprising:
      detecting, by the one or more sensors, a presence of the additional customer;
      receiving the order from the additional customer, the order comprising input that includes an utterance of the additional customer;
      modifying, using digital signal processing, the utterance to create a modified utterance;
      sending the modified utterance to the software agent;
      receiving a predicted response to the modified utterance from the software agent;
      playing back the predicted response via the speaker;
      determining that the order is complete;
      sending order data associated with the order to the restaurant; and
      instructing the additional customer to pick up the order.

8. One or more non-transitory computer-readable media storing instructions executable by one or more processors of an edge appliance to perform operations comprising:
   based at least in part on determining that the edge appliance is in a listen mode:
      capturing conversation data between a set of customers and one or more employees of a restaurant;
      transcribing individual conversations in the conversation data to create a set of transcriptions;

storing the set of transcriptions to create training data; and training a conversational artificial intelligence algorithm using the training data to create a software agent;

based at least in part on determining that the edge appliance is in an active mode;

causing the software agent to engage in an additional conversation to take an order from an additional customer using an order post, wherein the software agent is executed by one of:
the one or more processors of the edge appliance; or
a server that is connected to the edge appliance via a network;

providing, using a communication interface of the edge appliance, audio data that includes the additional conversation to a communications system associated with the restaurant;

providing, using the communication interface, a content of a cart associated with the order to a point-of-sale terminal associated with the restaurant;

based at least in part on determining, using the communication interface, that a microphone of the communication system is receiving audio input from a particular employee of the one or more employees of the restaurant:

automatically, without human interaction, transitioning the edge appliance to an override mode; and enabling the particular employee to receive a remainder of the order from the additional customer; and based at least in part on determining that the edge appliance is unable to provide the software agent:

automatically transitioning the edge appliance to a bypass mode;

routing an output of an order post microphone of the order post to a speaker of the communication system;

routing the output of the microphone of the communication system to an order post speaker of the order post; and enabling the particular employee to receive the remainder of the order from the additional customer.

9. The one or more non-transitory computer readable media of claim 8, the operations further comprising:

after enabling the particular employee to receive the remainder of the order from the additional customer, removing the software agent from the additional conversation with the additional customer.

10. The one or more non-transitory computer readable media of claim 8, the operations further comprising:

based at least in part on determining that the edge appliance is in the override mode:

determining that the edge appliance is able to provide the software agent; and automatically transitioning the edge appliance to the active mode.

11. The one or more non-transitory computer readable media of claim 8, wherein storing the set of transcriptions to create the training data comprises:

transferring at least a portion of the set of transcriptions to the server.

12. The one or more non-transitory computer readable media of claim 8, wherein the software agent engaging in the additional conversation with the additional customer to take the order from the additional customer comprises:

receiving, by the software agent, an utterance from the additional customer;

predicting, using the conversational artificial intelligence algorithm, a response to the additional customer based at least in part on the utterance; and providing the response to the additional customer.

13. The one or more non-transitory computer readable media of claim 8, wherein the order post comprises:

the order post speaker;

one or more sensors;

one or more order post processors;

an order post memory device to store order post instructions executable by the one or more order post processors to perform order post operations comprising:

detecting, by the one or more sensors, a presence of the additional customer;

receiving the order from the additional customer, the order comprising input that includes an utterance of the additional customer;

modifying, using digital signal processing, the utterance to create a modified utterance;

sending the modified utterance to the software agent;

receiving a predicted response to the modified utterance from the software agent;

playing back the predicted response via the speaker;

determining that the order is complete;

sending order data associated with the order to the restaurant; and instructing the additional customer to pick up the order.

14. The one or more non-transitory computer readable media of claim 8, wherein training the conversational artificial intelligence algorithm using the training data to create the software agent comprises:

determining that an amount of the training data satisfies a training data threshold;

training the conversational artificial intelligence algorithm using the training data to create the software agent; and transitioning the edge appliance to the active mode.

15. A method performed by an edge appliance, the method comprising:

based at least in part on determining that the edge appliance is in a listen mode:

capturing conversation data between a set of customers and one or more employees of a restaurant;

transcribing individual conversations in the conversation data to create a set of transcriptions;

storing the set of transcriptions to create training data; and training a conversational artificial intelligence algorithm using the training data to create a software agent;

based at least in part on determining that the edge appliance is in an active mode:

causing the software agent to engage in an additional conversation to take an order from an additional customer using an order post, wherein the software agent is executed by one of:
one or more processors of the edge appliance; or
a server that is connected to the edge appliance via a network;

providing, using a communication interface of the edge appliance, audio data that includes the additional conversation to a communications system associated with the restaurant;

providing, using the communication interface, a content of a cart associated with the order to a point-of-sale terminal associated with the restaurant;

based at least in part on determining, using the communication interface, that a microphone of the communication system is receiving audio input from a particular employee of the one or more employees of the restaurant:
    automatically, without human interaction, transitioning the edge appliance to an override mode; and
    enabling the particular employee to receive a remainder of the order from the additional customer; and
based at least in part on determining that the edge appliance is unable to provide the software agent:
    automatically transitioning the edge appliance to a bypass mode;
    routing an output of an order post microphone of the order post to a speaker of the communication system;
    routing the output of the microphone of the communication system to an order post speaker of the order post; and
    enabling the employee to receive the remainder of the order from the additional customer.

16. The method of claim 15, further comprising:
after enabling the particular employee to receive the remainder of the order from the additional customer, removing the software agent from the additional conversation with the additional customer.

17. The method of claim 15, further comprising:
based at least in part on determining that the edge appliance is in the override mode:
    determining that the edge appliance is able to provide the software agent; and
    automatically transitioning the edge appliance to the active mode.

18. The method of claim 15, wherein storing the set of transcriptions to create the training data comprises:
transferring at least a portion of the set of transcriptions to the server.

19. The method of claim 15, wherein the software agent engaging in the additional conversation with the additional customer to take the order from the additional customer comprises:
    receiving, by the software agent, an utterance from the additional customer;
    predicting, using the conversational artificial intelligence algorithm, a response to the additional customer based at least in part on the utterance; and
    providing the response to the additional customer.

20. The method of claim 15, wherein training the conversational artificial intelligence algorithm using the training data to create the software agent comprises:
    determining that an amount of the training data satisfies a training data threshold;
    training the conversational artificial intelligence algorithm using the training data to create the software agent; and
    transitioning the edge appliance to the active mode.

* * * * *